(12) United States Patent
Okuyama et al.

(10) Patent No.: US 7,437,413 B2
(45) Date of Patent: Oct. 14, 2008

(54) TEXT MESSAGING SYSTEM AND METHOD

(75) Inventors: Satoshi Okuyama, Kawasaki (JP); Ai Manabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 669 days.

(21) Appl. No.: 09/772,000

(22) Filed: Jan. 30, 2001

(65) Prior Publication Data

US 2001/0005859 A1   Jun. 28, 2001

Related U.S. Application Data

(63) Continuation of application No. PCT/JP99/02353, filed on Apr. 30, 1999.

(30) Foreign Application Priority Data

Aug. 6, 1998   (JP) ................... 10-222655

(51) Int. Cl.
   *G06F 15/16* (2006.01)
   *H04M 3/42* (2006.01)
   *H04Q 7/20* (2006.01)
   *H04B 1/38* (2006.01)

(52) U.S. Cl. .................... 709/206; 379/93.27; 455/417; 455/445; 455/466; 455/561; 455/566

(58) Field of Classification Search ................ 455/466, 455/566, 445, 561, 417, 412.3, 424, 467; 379/88, 93.27; 709/200, 206
See application file for complete search history.

(56) References Cited

U.S. PATENT DOCUMENTS 5,706,211 A * 1/1998 Beletic et al. ............... 709/206

5,757,901 A   5/1998 Hiroshige (Continued)

FOREIGN PATENT DOCUMENTS

EP   0 777 394 A1   6/1997

(Continued)

OTHER PUBLICATIONS

Supplementary European Search Report dated Jan. 28, 2005 from European Patent Office for Application 99918310.6-1244-JP9902353.

(Continued)

*Primary Examiner*—Ario Etienne
*Assistant Examiner*—Avi Gold
(74) *Attorney, Agent, or Firm*—Staas & Halsey LLP

(57) ABSTRACT

The text messaging system consists of mobile terminal (5) connected to mobile communication network (4), information terminal (3) connected to computer network (2), and server (1) connected to the mobile communication network and the computer network. The information terminal (3) has status detection means (22), (23), and (24), and detects an operational status including at least the connection status of the computer network and notifies the server (1) of it. The server (1) has status administration means (8) and (9) and decision means (10). The status administration means (8) and (9) retain the operational status of the information terminal (3) notified from status detection means (24) for each user. The decision means (10) determines a send mode according to the operational status of the information terminal such as whether to send a text message to an information terminal or to send a text message with a network application.

14 Claims, 18 Drawing Sheets

U.S. PATENT DOCUMENTS

| | | | | |
|---|---|---|---|---|
| 5,844,969 | A * | 12/1998 | Goldman et al. | 379/93.24 |
| 5,872,926 | A * | 2/1999 | Levac et al. | 709/206 |
| 6,052,565 | A * | 4/2000 | Ishikura et al. | 455/67.11 |
| 6,108,688 | A * | 8/2000 | Nielsen | 709/206 |
| 6,128,512 | A * | 10/2000 | Trompower et al. | 455/561 |
| 6,178,331 | B1 * | 1/2001 | Holmes et al. | 455/466 |
| 6,219,694 | B1 * | 4/2001 | Lazaridis et al. | 709/206 |
| 6,237,027 | B1 * | 5/2001 | Namekawa | 709/206 |
| 6,334,140 | B1 * | 12/2001 | Kawamata | 709/202 |
| 6,519,471 | B1 * | 2/2003 | Yamaguchi | 455/517 |
| 6,701,378 | B1 * | 3/2004 | Gilhuly et al. | 709/249 |

FOREIGN PATENT DOCUMENTS

| | | |
|---|---|---|
| JP | 57-147748 | 9/1982 |
| JP | 58-132849 | 8/1983 |
| JP | 61-025331 | 2/1986 |
| JP | 61-100860 | 5/1986 |
| JP | 62-160557 | 7/1987 |
| JP | 01-297956 | 12/1989 |
| JP | 02-058464 | 2/1990 |
| JP | 03-062636 | 3/1991 |
| JP | 03-113953 | 5/1991 |
| JP | 03-220953 | 9/1991 |
| JP | 04-316227 | 11/1992 |
| JP | 04-337794 | 11/1992 |
| JP | 04-344787 | 12/1992 |
| JP | 05-022438 | 1/1993 |
| JP | 5-167610 | 7/1993 |
| JP | 05-167610 | 7/1993 |
| JP | 05-199158 | 8/1993 |
| JP | 7-72923 | 3/1995 |
| JP | 07-079485 | 3/1995 |
| JP | 08-237370 | 9/1996 |
| JP | 08256216 | 10/1996 |
| JP | 09-018509 | 1/1997 |
| JP | 09-046413 | 2/1997 |
| JP | 3038684 | 4/1997 |
| JP | 09-160855 | 6/1997 |
| JP | 9-191309 | 7/1997 |
| JP | 10013461 | 1/1998 |
| JP | 10-66134 | 3/1998 |
| JP | 10-107835 | 4/1998 |
| JP | 10-107914 | 4/1998 |
| JP | 10-185599 | 7/1998 |
| JP | 11-098552 | 4/1999 |
| WO | WO 98/16045 | 4/1998 |

OTHER PUBLICATIONS

Japanese Office Action JP 10-222655.

* cited by examiner

| Name | Mobile Phone Number | E-mail Address | PC IP Address | IRC Server Name, Channel Name, Nickname | Screensaver Status | PC-in-Operation Status | Phone Number of Current Whereabouts |
|---|---|---|---|---|---|---|---|
| User A | 020-111-1111 | | | | | | |
| User B | 020-222-2222 | | 111.111.111.111 | | | | |
| User C | 020-444-4444 | taro | 444.444.444.444 | | | | |
| User D | 020-333-3333 | | 222.222.222.222 | irc.co.jp #CA yama | | ON | 111-111-1111 |
| User E | 020-444-4444 | | 333.333.333.333 | | ON | | 123-456-7890 |

Fig. 2

| Sender Name | Receiver Name | Sender Type | Receiver Type | Timer ID | Text Message |
|---|---|---|---|---|---|
| 020-333-3333 | 020-111-1111 | Mobile Phone | Mobile Phone | 10 | Give me a Call |
| User B | 020-111-1111 | PC Text Message | PC Text Message | 11 | I Sent a Document |
| 020-111-1111 | 020-444-4444 | Mobile Phone | PC Text Message | 12 | I am Scheduled to Return to the Office at 3 p.m. |

*Fig. 3*

TEXT MESSAGING SYSTEM AND METHOD

This is a continuation of International Application PCT/JP99/02353, with an international filing date of Apr. 30, 1999.

BACKGROUND OF THE INVENTION

1. Technical Field

The present invention relates to a text messaging system for sending and receiving text messages among mobile terminals and information terminals connected via a network. More particularly, the present invention relates to a text messaging system for sending and receiving according to sender and receiver status text messages whose immediacy is strong, among multiple mobile terminals and information terminals connected to a computer network such as mobile a communication network or packet exchange network.

In the present invention, "packet exchange networks" mean networks for connecting personal computers (PC), workstations (WS), and PDAs (personal digital assistants); and the Internet, local area networks (LAN) and intranets can be cited as examples of packet exchange networks.

Mobile terminals are not particularly limited as long as they can send and receive text information via a mobile communication network, and mobile phones, personal handyphone systems (PHS), car phones, and pocket beepers can be cited as examples of mobile terminals. Information terminals are not particularly limited as long as they can send and receive text information via a network, and PCs, WSs, and PDAs can be cited as examples of information terminals.

2. Description of Related Art

FIG. 21 shows a conceptual structure of a conventional text messaging system using mobile phones, PHSs, and a center for relaying them.

A mobile terminal A sends wirelessly to a text message center text messages addressed to a mobile terminal B (1). The center comprehends condition of each mobile terminal with a detection part of radio condition. If the mobile terminal B is receivable, the text message center transmits the text message to the mobile terminal B. If the mobile terminal B is unreceivable because it is out of the radio area, for example, the text message center stores the text message in the storage area (2). At the moment that the mobile terminal B becomes receivable the text message center transmits the text message (3, 4, 5, 6, 7). A part of the mobile terminals B may connect to the center and obtain the text message stored in the center. Furthermore, text messages may be transmitted from mobile terminal A to mobile terminal B directly, not via the center. In this case, if the destination terminal is out of the radio area or on the phone, text messages are not received.

In the above-mentioned system in FIG. 21, a setting that e-mail is forwarded to a designated address is previously made. By storing in the center e-mail reached the designated address as a text message to a mobile terminal, e-mail is liaised with mobile terminals (9). There is also a system in which sender, title, and importance level of e-mail are previously set. When e-mail corresponding to forwarding conditions reaches the center, the e-mail is forwarded to a mobile terminal. Conversely, there is a system that when an e-mail address is inputted on the destination in a mobile terminal, the center transmits text messages as e-mail (8).

There already exists a system other than those above that an e-mail server detects e-mail arrival and notifies a predetermined mobile terminal of incoming of mail with information such as a sender of the e-mail, the title, and the time.

Meanwhile, as a means to detect other parties, statuses on a network, a monitor service of link state to the network, a busy condition management service of a service such as chat or electronic conference, an inventory management service, and a service computerized destination board are provided.

However, in a conventional text messaging system, text messages from mobile terminals are forwarded to e-mail only if such a setting is made. Receive messages cannot be received on a mobile terminal unless the setting once made is canceled. Furthermore, these setting and canceling are very troublesome. Receivers selectively use a send method of text messages such as e-mail and transfer to a mobile terminal regardless of the other party's status. On this account, selecting or switching a send mode according to the other party's status, which dynamically changes, is not performed.

For example, assume that a partner receiving text messages is connected to a network with a PC. In this case, receiving character messages on the PC instead of a mobile terminal is convenient for replying, enabling text messages to be immediately transmitted. Text messages of a mobile terminal are stored if the other party cannot receive them, but the sender cannot know that the messages are not immediately received. Under such circumstances, the sender cannot know if he/she needs to take another means or measure because the other party does not look at the sent text messages.

Since liaison of text message communication between mobile terminals and PCs are limited, it is difficult to freely transmit text messages to an information terminal currently used by the other party with a network application currently used by the other party. On this account, a user cannot communicate according to the other party's status and it is inconvenient for the user even if he/she know that the other party is connected to a network or network service in a place away from home.

Furthermore, an e-mail system can notify the sender a status that a sent e-mail did not reach the other party, for example. However, this system does not manage such dynamically-changing send result as the other party not having check the e-mail for certain time or the other party not having read it while he was using a network service.

SUMMARY OF THE INVENTION

The present invention aims at providing technologies for sending and receiving text messages with mobile terminals such as mobile phones and PCs in real time according to the utilization status of dynamically-changing information terminals.

A first aspect of the present invention provides a text messaging system comprising multiple information terminals having communication means, and a server connected to the above-mentioned information terminals via a communication line suitable to the above-mentioned communication means. The above-mentioned information terminals have send means, receive means, and status detection means. The send means sends to a server a text message addressed to another information terminal. The receive means receives from another information terminal the text message from another information terminal. The status detection means detects operational status including at least link state to the communication line and notifies the server of it.

The server has receive means, send means, status administration means, and decision means. The receive means receives text messages from information terminals. The send means sends text messages received from information terminals to other information terminals. The status administration means retains operational statuses of information terminals notified from the status detection means for every users. The decision means determines send modes of text messages according to operational statuses of information terminals.

Mobile communication networks, call switching networks such as PSTN (public switched telephone network), and packet switched networks can be cited as communication lines. A server comprehends operational statuses of information terminals because each information terminal reports operational status such as condition of connection to a communication line to the server. For example, assume that user A sends a text message from a PC on a communication line to another user B via a server. The server determines whether or not the PC of user B is connected to the communication line, and if it is connected, the server sends the text message to the PC of user B. If it is not connected to the communication line, the server transmits the text message to the mobile phone of user B.

A second aspect of the present invention provides a text messaging system comprising one or more mobile terminals and information terminals respectively having communication means and a server connected to the above-mentioned mobile terminals and mobile information terminals via a communication line according to communication means.

The information terminals have send means, receive means, and status detection means. The send means sends to the server text messages addressed to other mobile terminals or information terminals. The receive means receives from the server text messages sent from other mobile terminals or information terminals. The status detection means detects operational status including at least link state to the communication line and notifies the server of it.

The server has receive means, send means, status administration means, and decision means. The receive means receives text messages from information terminals. The send means sends text messages received from mobile terminals or information terminals to other mobile terminals or information terminals. The status administration means retains operational statuses of information terminals notified from the status detection means for every users. The decision means determines send modes of text messages according to operational statuses of information terminals. PCs and WSs notify the server of at least the status of a link to a communication line and the server retains the notified status of the information terminal. When user A sends a text message to other user B via the server, information that user B is identified by is included in the text message to be sent. Specifically, a text message from a mobile terminal includes a telephone number of user B, ID, etc. The status administration means of the server obtains operational status of the user B's PC based on the information included in the text message. The decision means determines a send mode according to the present status of the PC if text messages can be sent to the user B's PC. Otherwise the decision means forwards the text message to the mobile terminal of user B.

A third aspect of the present invention provides a text messaging system wherein the status detection means detects whether or not an information terminal is being used and notifies the server of it and the decision means determines the information terminal as a receiver of the text message if the information terminal is being used.

In other words, the status detection means determines whether or not the information terminal is being used. The determination is performed by detecting operation of a mouse or a keyboard of the information terminal such as a PC or operational status of a screen saver. In this case, the decision means of the server sends a text message to the PC if the destination PC is being used. Otherwise a destination can be determined so that the text message is sent to a mobile terminal.

A forth aspect of the present invention provides a text messaging system wherein an information terminal further has service detection means which detects the operational status of a network application in the information terminal and notifies a server of it. In this system, the status administration means of the server retains the operational statuses of a notified network application, and if the network application can operate on the server, the decision means determines the sending of a text message with the network application when the network application is operating on the information terminal.

The service detection means detects that a predetermined network application for utilizing WWW (World Wide Web), IRC (Internet Relay Chat), E-mail, etc. is started and notifies the server of it. On the server side, the decision means determines the sending of a text message with a network application operating in a destination information terminal. For example, a text message is sent by e-mail if a destination PC is using an e-mail application or the text message is sent by chat if the destination PC is using a chat application.

A fifth aspect of the present invention provides a text messaging system wherein the send means of an information terminal can notify a server that a text message was read, and the server further has reporting administration means which saves the text message sent to the information terminal and forwards the text message to the information terminal if that the text message was read is not notified.

For example, the receive means of a PC displays a received text message on the corner of the screen. When the displayed message is deleted, the receive means determines that the text message is read and notifies the send means of it. The send means sends "already-read notification" to the receive means of the server. Meanwhile, the sent text message, the sender, the name of the destination, etc. are notified reporting administration means from the decision means and the reporting administration means saves them. The saved text message is deleted when "already-read notification" is received from the information terminal. However, as for a text message for which "already-read notification" is not notified, the saved text message is forwarded to a mobile terminal.

A sixth aspect of the present invention provides a text messaging system wherein a reporting administration means forwards a text message sent to an information terminal according to the variation of the operational status of the information terminal.

The status change of an information terminal is notified the reporting administration means from the status administration means. For example, if the notification of disconnection from a communication line is sent prior to "already-read notification", the sent text message is forwarded to the mobile terminal.

A seventh aspect of the present invention provides a text messaging system wherein if a text message sent to the information terminal is not read within a prescribed time period, the reporting administration means forwards the text message to the mobile terminal.

The reporting administration means activates a timer when the sent text message is notified the reporting administration means from the decision means. The reporting administration means determines that the sent text message is not read in the information terminal if the text message is left after a prescribed time, and then sends the text message to the information terminal on the communication line.

An eighth aspect of the present invention provides a text messaging system wherein the reporting administration means of the server notifies a text message sender that the text message is sent to a mobile terminal in a prescribed case.

The reporting administration means notifies a text message sender that the text message is sent to a mobile terminal in a prescribed case. The prescribed case means a case that, for example, a text message was unable to be sent to an information terminal or a text message is not read in the information terminal. The prescribed case may include a case that, for example, a prescribed identifier is inserted into a text message. If a user needs the notification of a send result, he/she can hope for the notification by inserting an prescribed identifier into a text message to be sent.

A ninth aspect of the present invention provides a text messaging system wherein the reporting administration means stores a text message and notifies the text message sender that the text message is stored if it cannot send the text message to a mobile terminal.

There may be a case that a text message sent to a mobile terminal is stored in a server because the destination mobile terminal is out of the radio area or busy. If this is the case, the reporting administration means notifies the sending information terminal of it. A sending user can know if the text message is immediately transmitted. If the sending user requests the notification of a send result, he/she may add an identifier to a text message to be sent as described above.

A tenth aspect of the present invention provides a text messaging system wherein the status detection means of an information terminal notifies a server of a phone number for contact, the status administration means of the server retains the notified phone number, and when a text message is sent from the information terminal to a mobile terminal, the decision means adds the phone number to a text message and sends it if the phone number of the sender for contact is set.

The status detection means of the information terminal notifies the server of the phone number of the present whereabouts of a user. The status administration means of the server retains the notified phone number. The decision means refers to the status of a sending user when the destination of the text message from a PC such as a mobile terminal is selected. If the present phone number is set, the decision means adds the phone number to the text message as a callback phone number and sends it. If there is no present phone number, the decision means adds a default phone number of each user. This is convenient when a message receiver would like to inquire by phone instead of a character message.

An eleventh aspect of the present invention provides a text messaging system further having a quasi information terminal connected to the communications line. The quasi information terminal has receive means, information acquisition means, send means, and information setting means.

The receive means receives from a server a text message sent from a mobile terminal. The information acquisition means obtains the operational status of other information terminals according to received text messages. The send means sends the obtained operational status to the mobile terminal as a text message. The information setting means sets the operational status of other information terminals according to the received text message and notifies the server of it.

For example, user A sends a message that he/she would like to know the status of user B to a quasi information terminal from a mobile terminal. The quasi information terminal obtains the status of user B from the server. The obtained information is sent from the quasi information terminal to the mobile terminal of user A as a text message. User A sends the phone number of the whereabouts from the mobile terminal to the quasi information terminal as a text message. The quasi information terminal sends a text message that changes the present phone number of user A for contact.

A twelfth aspect of the present invention provides a text messaging system comprising one or more mobile terminals and information terminals respectively having communication means, a primary server connected to the above-mentioned information terminal via a communication line according to the above-mentioned communication means, and a secondary server connected to the above-mentioned mobile terminal and information terminal via a communication line according to the above-mentioned communication means.

The information terminal has send means, receive means, and status detection means. The send means sends to the secondary server a text message addressed to another mobile terminal or information terminal. The receive means receives from the secondary server a text message sent from another mobile terminal or information terminal. The status detection means detects at least the status of connection to a computer network and notifies the primary server of it.

The primary server has a status administration means that collects the operational status of an information terminal from the information terminal and retains it for each user.

The secondary server has receive means, send means, and decision means.

The receive means receives a text message from a mobile terminal or an information terminal. The send means sends a text message received from a mobile terminal or information terminal to another mobile terminal or information terminal. The decision means obtains the operational status of an information terminal from the primary server and determines the send mode of a text message according to the obtained operational status.

This is a system configuration that the primary server and secondary server shares the function of the server according to the second aspect of the present invention.

A thirteenth aspect of the present invention provides a text messaging system wherein an information terminal can further notify the secondary server that a text message was read and the secondary server further has a reporting administration means that forwards a text message to a mobile terminal if it is not notified that the text message was read.

This is a system configuration that the primary server and secondary server shares the function of the server according to the fifth aspect of the present invention.

The fourteenth aspect of the present invention provides a text message communication device having send means, receive means, and status detection means which is an information terminal that has communication means and sends and receives text messages among mobile terminals or other information terminals via a communication line and a server according to the above-mentioned communication means.

The send means sends to the server a text message addressed to another mobile terminal or information terminal. The receive means receives from the server a text message sent from another mobile terminal or information terminal. The status detection means detects an operational status including the status of connection to a communication network and notifies the server of it.

A fifteenth aspect of the present invention provides a server for text message communication which is a server connected to one or more mobile terminals or information terminals having communication means via a communication network according to the above-mentioned communication means and has receive means, send means, status administration means, and decision means.

The receive means receives a text message from a mobile terminal or information terminal. The send means sends a text message received from a mobile terminal or information terminal to another mobile terminal or information terminal. The status administration means receives an operational status from an information terminal and retains it for each user. The decision means determines a send mode of text message according to operational status of the information terminal.

A sixteenth aspect of the present invention provides a computer-readable recording medium which stores a text message communication program used for information terminals having communication means that sends and receives text messages among mobile terminals or other information terminals via a communication line or a server according to the above-mentioned communication means and stores a program for executing steps A to C below:

A: a send step that a text message addressed to another mobile terminal or information terminal is sent to the server;

B: a receive step that the text message sent from another mobile terminal or information terminal is received from the server; and C: a status detection step that an operational status including at least a status of connection to the communication line is detected and notified the server.

A seventeenth aspect of the present invention provides a computer-readable recording medium which stores a text message communication management program used for a server connected to one or more mobile terminals or information terminals respectively having communication means via a communication line according to the above-mentioned communication means and stores a text message management program for executing steps A to D below:

A: a receive step that a text message is received from a mobile terminal or information terminal;

B: a send step that the received text message is sent to another mobile terminal or information terminal;

C: a status administration step that the operational status of the information terminal is obtained and is retained for each user; and D: a determination step that the send mode of the text message is determined according to the operational status of the information terminal.

An eighteenth aspect of the present invention provides a text message communication method which uses one or more mobile terminals or information terminals respectively having communication means and a server connected to the above-mentioned mobile terminals and information terminals via a communication line according to the above-mentioned communication means, comprising:

A: sending and receiving a text message between a mobile terminal or information terminal and another mobile terminal or information terminal via the server;

B: detecting the operational status of the information terminal including at least status of connection to the communication line and notifying the server of it;

C: retaining the operational status of the information terminal for each user in the server; and D: determining the send mode of the text message according to the operational status of the information terminal by the server.

A nineteenth aspect of the present invention provides a text message send/receive method which is used for information terminals that have communication means and send and receive text messages among mobile terminals or other information terminals via a communication line and a server according to the above-mentioned communication means, comprising:

A: sending to the server a text message addressed to the above-mentioned mobile terminal or information terminal;

B: receiving from the server a text message sent from another mobile terminal or information terminal; and C: detecting the operational status including at least the status of connection to the communication line and notifying the server of it.

A twentieth aspect of the present invention provides a text message communication management method of a server connected to one or more mobile terminals or information terminals respectively having communication means via a communication line according to the above-mentioned communication means, comprising:

A: receiving from a mobile terminal or information terminal a text message addressed to another information terminal;

B: sending the received text message to another mobile terminal or information terminal;

C: collecting the operational status of the information terminal including at least the status of the connection to the communication line and retaining it for each user; and D: determining the send mode of the text message according to the operational status of the information terminal.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 2 is a conceptual explanatory diagram of data stored in a status-storing module;

FIG. 3 is a conceptual explanatory diagram of a message table in a reporting administration module;

DETAILED DESCRIPTION OF THE PREFERRED EMBODIMENTS

Best Mode for Implementing the Invention

Figure 1:
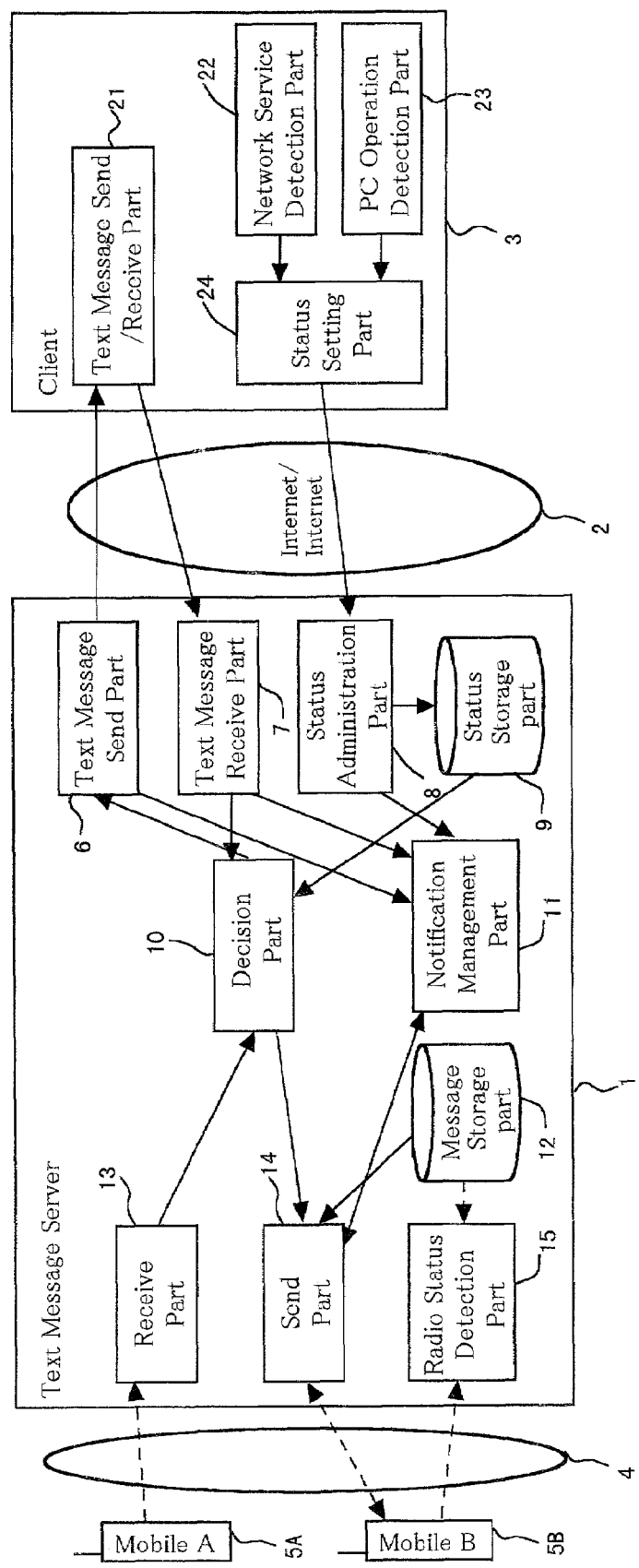
FIG. 1 is a functional block diagram of a text messaging system according to the first embodiment of the present invention.

Next gives a detailed explanation of the present invention referring to the drawings.

First Embodiment

FIG. 1 shows a functional block diagram of a text messaging system according to the first embodiment. The text messaging system according to the first embodiment consists of server 1 connected to Internet 2 and mobile communication network 4, multiple PC clients 3, and multiple mobile phones 5A, 5B, . . . on the mobile communication network 4. Incidentally, to simplify the drawing, only one PC client 3 is shown. The mobile phone can send and receive a text message. The server 1 is notified of a detected self status of each mobile phone such as "busy" or "out of radio area."

Server

The server 1 has text message send part 6, text message receive part 7, status administration part 8, status storage part 9, decision part 10, notification management part 11, message storage part 12, receive part 13, send part 14, and radio status detection part 15.

The text message send part 6 and text message receive part 7 send and receive a text message with the PC client 3 connected to the Internet 2, and send and receive send result notification of a text message or already-read notification of a text message with the PC client 3.

The status administration part 8 receives operational status of the PC client from the PC client 3 and stores it in the status storage part 9 for each user. The operational status of the PC client is, for example, activation and completion of Internet applications, connection and disconnection of the Internet 2, activation status of a screen saver, or PC in operation. The status administration part 8 receives stores prescribed information from the PC client 3 and stores it in the status storage part 9 for each user. The prescribed information is, for example, an e-mail address of each user, a nickname in IRC, a server and a channel, the phone number of a mobile phone, or present phone number.

FIG. 2 shows an example of an operational status and a phone number of each PC client retained for each user by the status storage part 9. As shown in FIG. 2, the status storage part 9 retains only one active status for each user. For example, even if one user has multiple PC clients, a PC for which an up-to-date status is set according to the user's operation is valid. In FIG. 2, if data are blank, it is determined that the status is null.

For example, a status of each PC client in FIG. 2 means the following:

User A: PC does not operate because there is not an IP address.

User B: PC is in operation and is connected to a network.

User C: PC is in operation and is connected to a network. E-mail is currently in use.

User D: PC is in operation. Chatting by IRC. PC is in operation. There is a phone number of a destination.

User E: PC is in operation. A screensaver is active. There is a phone number of a destination.

When the server 1 receives a text message addressed to any of the users, the decision part 10 operates as follows. The decision part 10 refers to the operational status of a PC client of the relevant user and determines a send mode which can receive the text message in real time. At this time, if an Internet application is active on the PC client of the relevant user, the decision part 10 determines that the text message is sent with the Internet application. If a PC client of the relevant user does not exist, is not connected to the Internet, or is not used, the mobile phone of the relevant user is determined as the destination of the text message. If necessary, the text message is converted after the determination of a send mode, and the send request of the text message is done to the message send part 6 or send part 14. The decision part 10 notifies the text message to be sent to the notification management part 11 to monitor the send result of the text message.

The notification management part 11 retains the text message sent in response to the notification from the decision part 10 in a message table. The notification management part 11 also sends send notification to the sender if the status of the text message corresponds to a prescribed case. The prescribed case is such that the other party did not read the text message within a prescribed time, the text message was not read while the network application is active, the text message is not read while the PC is connected to the Internet 2. FIG. 3 shows a conceptual diagram of the message table. In the message table shown in the figure, the name of a sender, the name of a receiver, the type of receiver, the timer ID, and the contents of the text message are retained.

The message storage part 12 temporally stores the text message if the text message is not immediately sent to the mobile terminal 5A, 5B, etc.

The receive part 13 and send part 14 are for sending and receiving the text message among mobile phones 5A and 5B.

Radio status detection part 15 detects notification from the mobile phone 5A or 5B and stores the status of the mobile phone such as within radio area or busy.

PC Client

The PC client 3 has text message send/receive 21, network service detection part 22, PC operation detection part 23, and status setting part 24.

The text message send/receive part 21 sends and receives the text message with the server 1, notifies the user of the send result of the text message sent from the server 1, and further notifies the server 1 that the received text message was read according to the input of the user. Incidentally, the text message send/receive part 21 may be an independent application or another Internet application for sending and receiving text messages can be substituted. An e-mail application or an IRC application is cited as an example of an application for sending and receiving text messages.

The network service detection part 22 detects the activation and completion of a network application. Specifically, it detects the connection and disconnection of an webpage or the activation and completion of an e-mail or IRC application, and notifies the status setting part 24 of it each time the status changes. At the same time, it detects an e-mail address, a nickname used for IRC, a server, and a channel and notifies of them.

The PC operation detection part 23 monitors a user status and notifies the status setting part 24 of it each time the status changes. Specifically, it monitors whether or not there is input by keyboard or mouse, the PC client 3 connects to or disconnects from a network by LAN or dial up, the screensaver is active, input by keyboard or mouse is done on the top window in multiwindow. The PC operation detection part 23 also sends "connection message" to the status administration part 8 of the server 1 at every definite period of time. If "connection message" does not come within a period of time, the status administration part 8 determines that the PC client 3 is disconnected from the Internet 2.

The status setting part 24 notifies the status administration part 8 of the server of the status of the PC client detected by the above-mentioned service detection part 22 and the PC operation detection part 23. The status setting part 24 receives the mobile phone number of the user and the present phone number and notifies the status administration part 8 of the server 1 of them. Furthermore, the status setting part 24 obtains the operational status of the PC client of another user, destination, contact address, etc. from the server 1 and outputs them.

Processes on PC Client

Next gives a specific explanation of the process done by the PC client according to the embodiment (process done by the application) showing screen examples and flowcharts.

(1) Screen Example

"In" Status Setting Window

Figure 4:
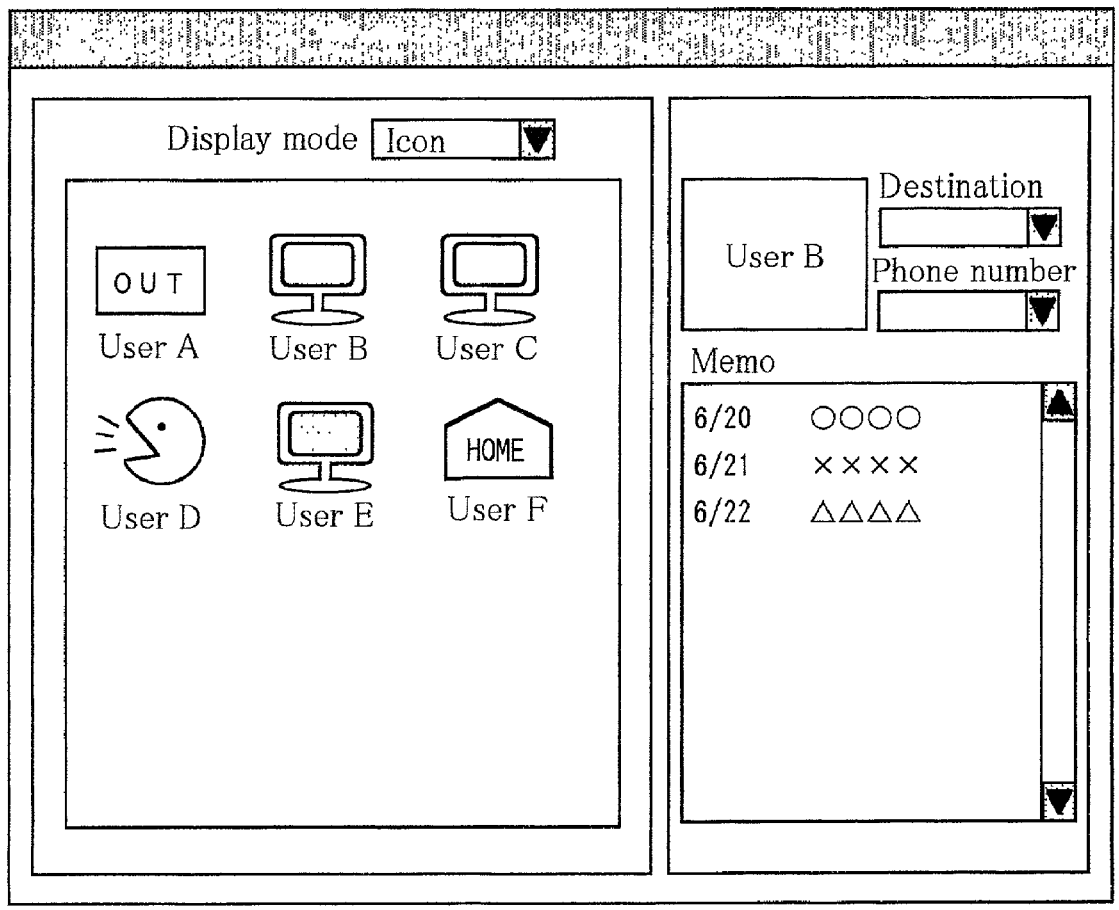
FIG. 4 is a display example of a window for setting status.

FIG. 4 shows an example of a window for setting whereabouts of the user. The right side of the screen shown in the figure is a presence status setting window. This window is for writing presence status of the user (present, absent, away from seat, in council, in laboratory, etc.), his/her destination, phone number, brief schedule, etc. Input in the window by the user notifies the status administration part of the server 1 of a presence status. The presence status of another user obtained from the server 1 by the status setting part is displayed on a window on the left side in the figure.

Text Message Send Window

Figure 5:
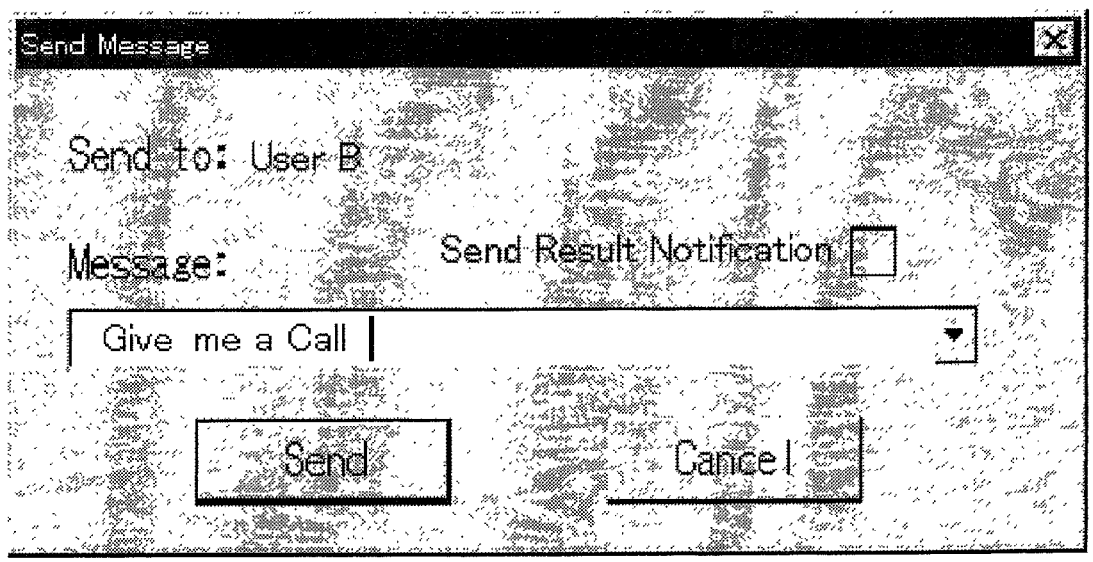
FIG. 5 is a display example of a text message send window.

FIG. 5 shows an example of a message send window in the PC client 3. Selecting the receiver of a text message on the above-mentioned left window in the figure opens the text message send window. With this, a brief message such as "hey, come on" or "call me" can be notified substantially in real time if the other party connects to the Internet 2 with a PC client. Furthermore, by checking the send result notification box, the result notification of a sent message can be asked for.

Text Message Receive Window

Figure 6:
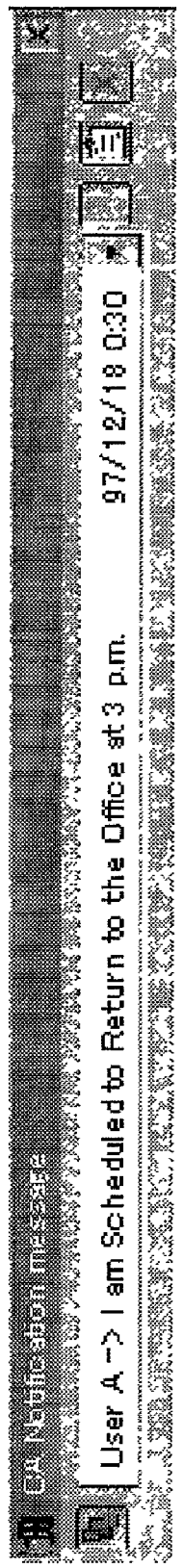
FIG. 6 is a display example of a text message receive window.

FIG. 6 shows the receive window of text messages. The receive window is displayed in the corner of the screen without being displayed in front of the window being used. On the right side of the window, there is a button for replying by call or text message. This button is for immediately replying to a received text message. The button on the right edge is for abandoning the text message without replying to it. By pressing any of the buttons or closing the window, the already-read message showing the text message was read is sent to the server 1 from the PC client 3. The text message receive part 6 of the server 1 that received notification notifies the notification management part 11 of an already-read notification.

Figure 7:
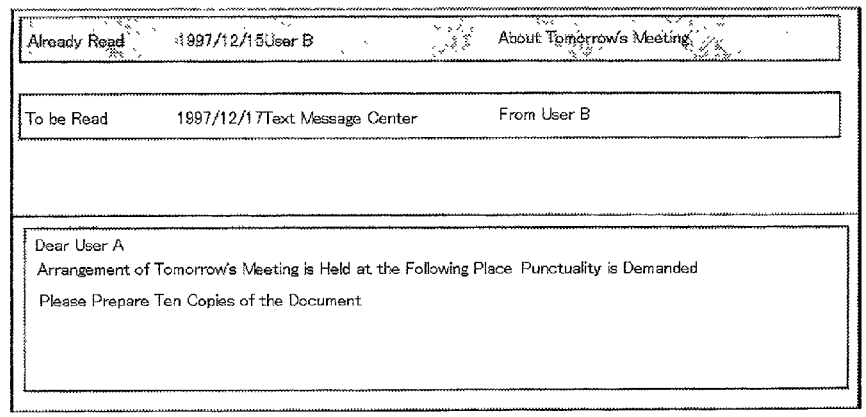
FIG. 7 is a display example of an e-mail text message receive window.
Figure 8:
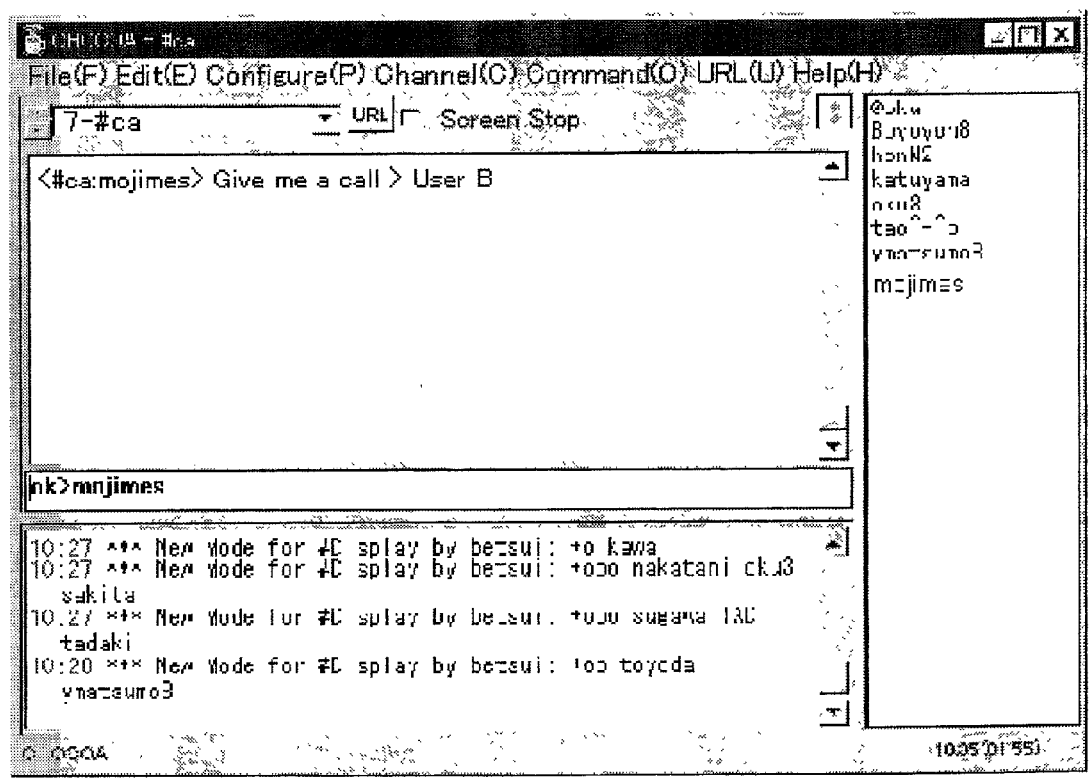
FIG. 8 is a display example of an IRC text message receive window.

If the PC client 3 where an Internet application is in operation received a text message, the receive window is displayed with the application window. FIG. 7 is a screen example when a text message is received while an e-mail application is being used. A message from user B indicated as to-be-read in FIG. 7 is a message send by the present invention. FIG. 8 is a screen example when a text message is received while the IRC application is being used. If these Internet application are being used, the mail becoming already-read or reply input to a chat is detected with the service detection part 22 of the PC client 3 and is notified the server 1.

(2) Operational Status Notification Process

Figure 9:
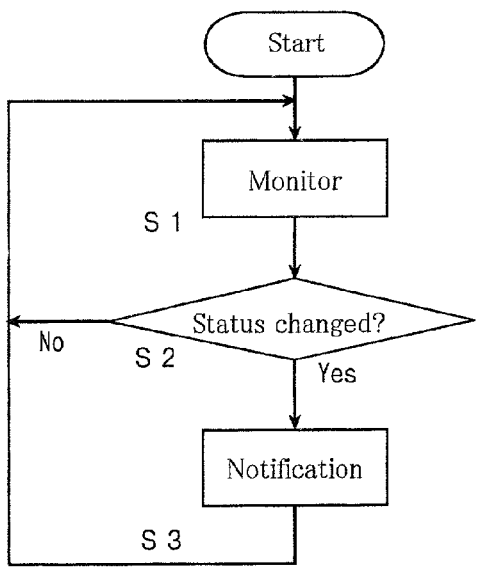
FIG. 9 is a flowchart showing flow of an operational status notification process.
Figure 10:
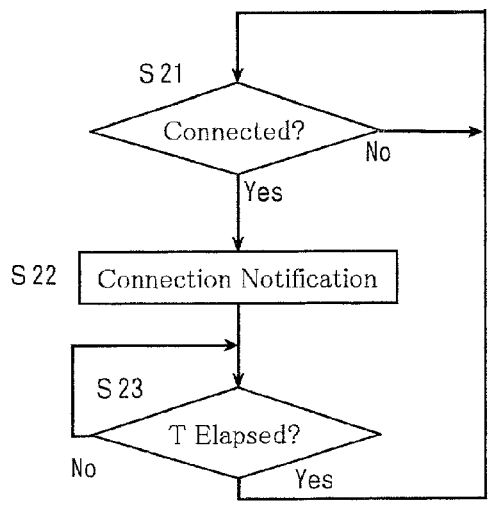
FIG. 10 is a flowchart showing flow of a connection status notification process.

Once a PC is powered and connected to the server via the Internet, the operative status notification process shown in FIG. 9 and the connection status notification process shown in FIG. 10 are commenced.

At first in step S1, the above-mentioned network service detection part 22 and the PC operation detection part 23 monitor the operational status of the PC client 3.

In step S2, the service detection part 22 and the PC operation detection part 23 determine whether or not there is a change in the operational status. If there is a change, a new status is notified the status setting part 24 and step S3 ensues. If there is no changes in the operational status, the process returns to step S1.

In step S3, the status setting part 24 received the notification notifies the server 1 of a new operational status. At the moment, information for identifying the user such as a user name or an IP address is added and notified, and the process returns to step S1 to monitor occurrence of a new status change.

In other words, in steps S1 to S3, a process that the change of the operational status of the PC client is notified the server 1 is performed.

Meanwhile, the PC operation detection part 23 performs the connection status notification process shown in FIG. 10 in addition to the monitor and detection of the PC operation in the above-mentioned steps S1 and S2 and notifies the several of the connection status.

At first, in step S21, the PC operation detection part 23 determines whether or not the PC client 3 is connected to the Internet 2. If the result is "Yes", step S22 ensues. If the result is "No", the process returns to step S21 again and repeat the above-mentioned determination.

In step S22, the PC operation detection part 23 sends the connection notification to the server 1 via the status setting part 24.

In step S23, the PC operation detection part 23 waits for the elapse of predetermined time T and if the time elapsed, the process returns to step S21 and repeats the above-mentioned determination and connection notification.

Namely, in steps S21 to S23, while the PC client 3 is connecting to the Internet 2, a process that the connection notification to the server 1 is performed every time the predetermined time T elapses.

(3) Send Process

Figure 11:
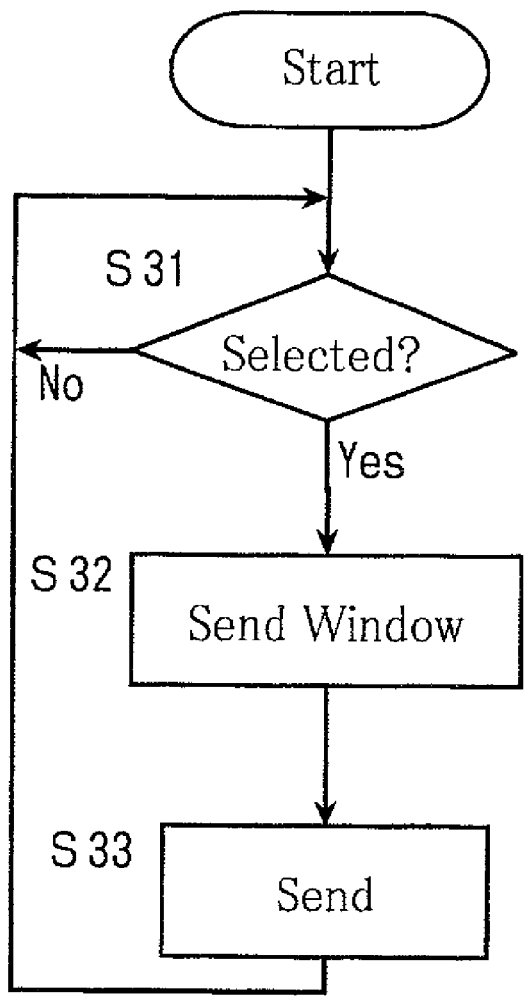
FIG. 11 is a flowchart showing flow of a send process.

When the PC is powered and connected to the server via the Internet, the send process as shown in FIG. 11 are commenced along with the above-mentioned operation status notification process and the connection status notification process.

In step S31, the text message send/receive part 21 determines whether or not the other party a text message is sent to was selected. If the result is "Yes", step S32 ensues. Otherwise the process repeats the step and waits for the other party to be selected.

In step 32, the text message send/receive part 21 opens the text message send window in FIG. 5 and accepts the input of a text message to be sent.

In step S33, the text message send/receive part 21 waits for the "Send" button to be pressed. When the button is pressed, the input message is sent to the serve with the sender's name and the process returns to step S31.

(4) Receive Process

Figure 12:
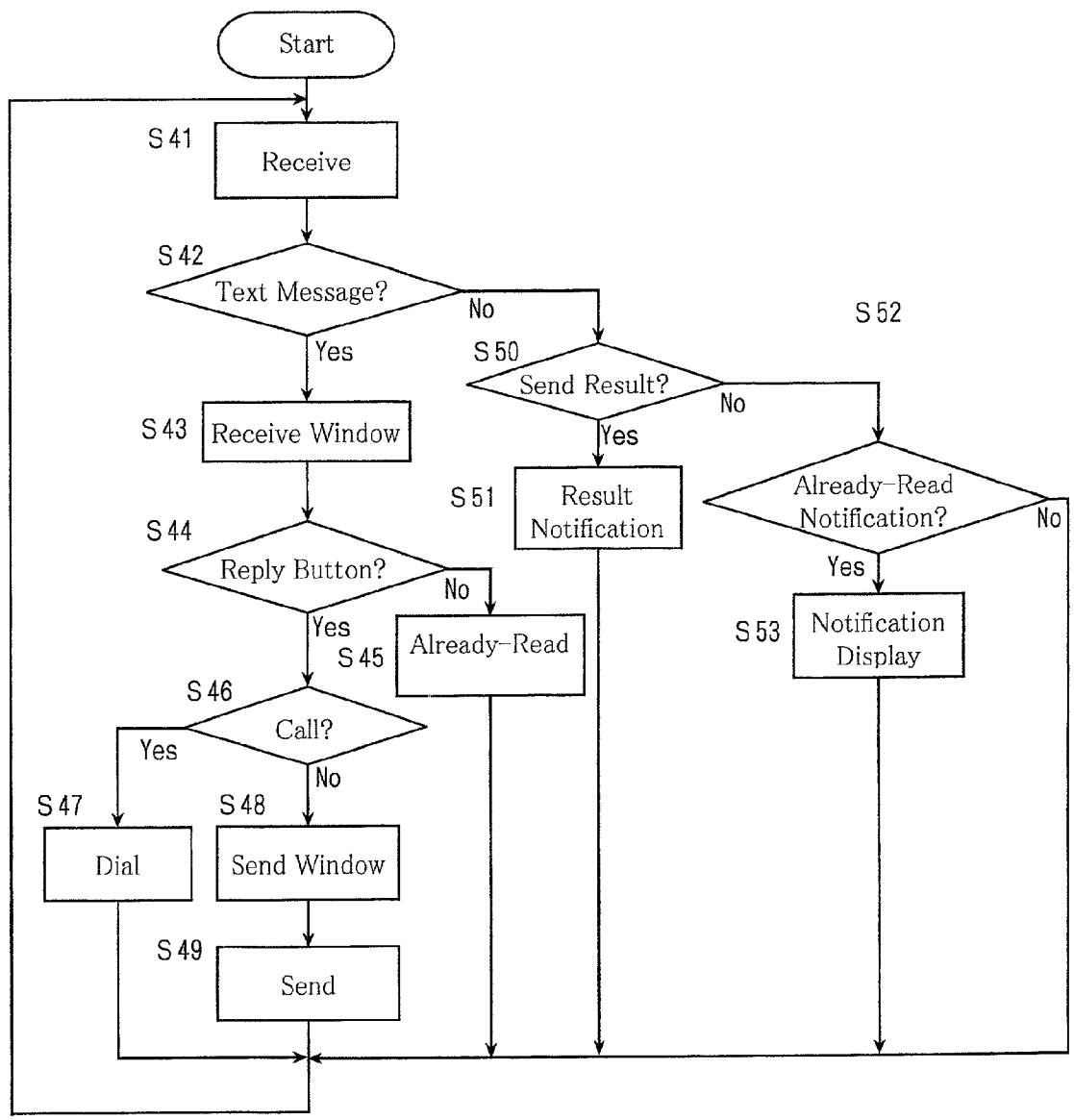
FIG. 12 is a flowchart showing flow of a receive process.

When the PC is powered, a receive process as shown in FIG. 12 is commenced in parallel with the above-mentioned process.

At first, in step S41, the text message send/receive part 21 waits for a reception from the server 1 and if there is a reception, step S42 ensues.

In step S42, the text message send/receive part 21 determines whether or not the reception is a text message from another user. If the result is "Yes", step S 43 ensues. Otherwise step S50, which will be descried below, ensues.

In step S43, the text message send/receive part 21 opens the receive window exemplified in FIG. 6, 7, or 8, notifies the user of the received text message part, and obtains a sender number included in the sent text message such as an IP address.

In step S44, the text message send/receive part 21 determines whether or not the reply button was pressed. If the above-mentioned read-and-abandon button was pressed or the window was closed, step S45 ensues. If the reply button was pressed, step S46 ensues.

In step 545, the text message send/receive part 21 sends a already-read notification that notifies the server that the text message was read.

In step S46, the text message send/receive part 21 determines whether the pressed reply button is the button for call. If the button for call was pressed, the step S47 ensues. If the reply button by text message was pressed, step S48 ensues.

In step S47, the text message send/receive part 21 dials the mobile-phone number of the other party or the phone number of current whereabouts that is notified with the text message. The receive wait state in step S41 returns.

In step S48, the text message send/receive part 21 opens the text message send window as shown in the above-mentioned FIG. 5 and accepts the input of a text message. By the text message being input and the "Send" button being pressed in step S49, the inputted text message is sent. The destination of the text message to be sent is set to the sender of the text message that is previously obtained.

If it is determined that the reception is not a text message in step S42, step S50 ensues. In step S50, the text message send/receive part 21 determines whether or not the send result of the text message is received. If the reception is the send result, then step S51 ensues, the send result notified from the server 1 is notified the user, and the receive wait state in step S41 returns. For example, a send result "The message addressed to 020-222-222 was not read and forwarded to the mobile phone." is displayed on the screen. If the reception is not the send result, step S52 ensues.

In step S52, the text message send/receive part 21 determines whether or not the reception is an already-read notification. If the reception is the already-read notification, step S53 ensues and it is notified the user that the sent text message is read by the other party. For example, as the result display of the mail in FIG. 7, the text message is displayed in catalogue and the relevant message part is displayed with half-tone dot meshing or a color. After that the receive wait state of step S41 returns.

Processes on the Server

The flow of the process performed by the server 1 is explained with a flowchart. In the following description, the operational status of each PC client is shown in the above-mentioned FIG. 2. The server 1 can support an e-mail or IRC application used by the PC client. To simplify the description, a case that a text message is sent from the mobile phone 5A of user A to the mobile phone of another user C is described as a example.

(1) Decision Process

Figure 13:
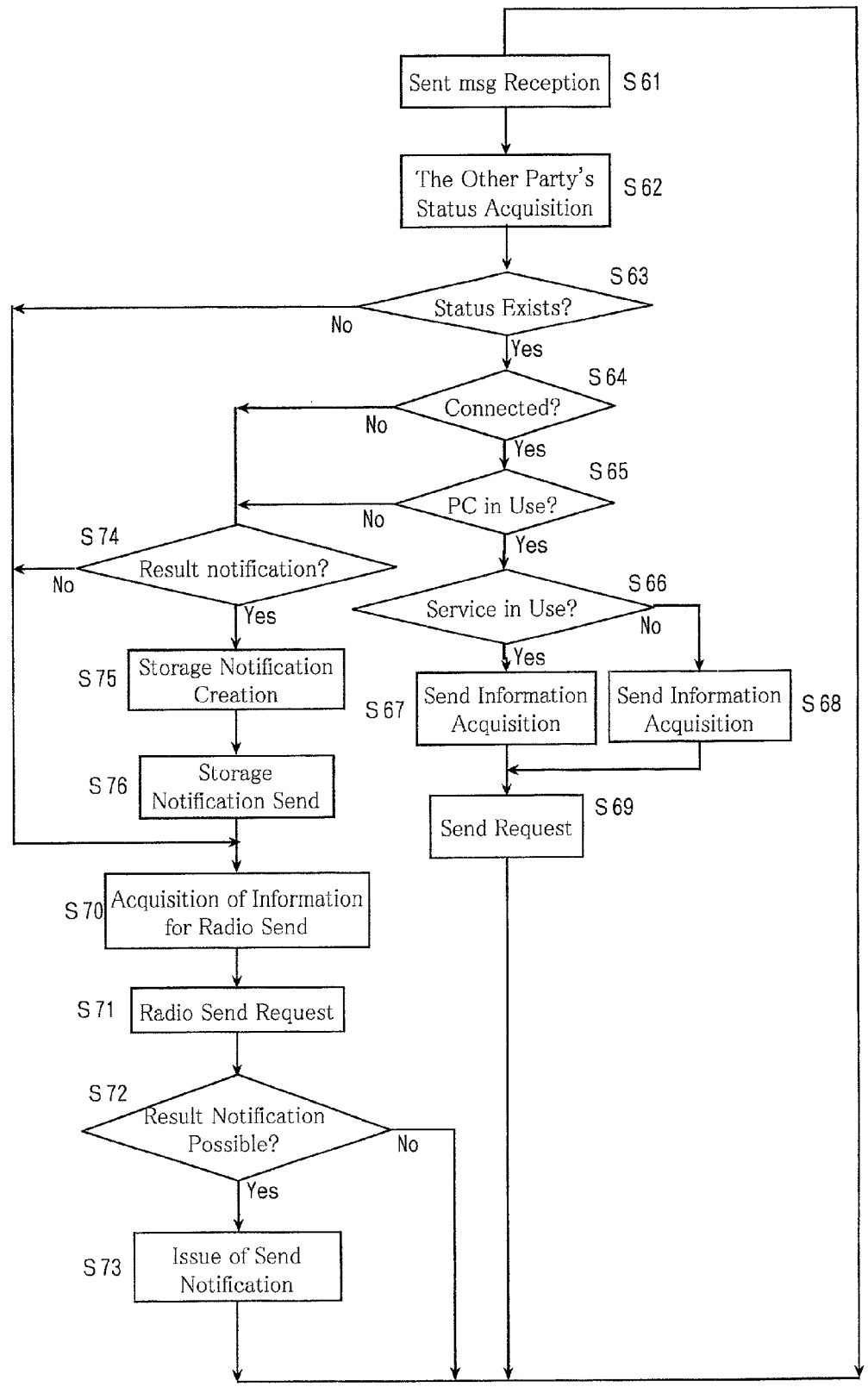
FIG. 13 is a flowchart showing process flow in a decision part.

At first, flow of the process performed by the decision part 10 based on FIG. 13 is explained.

In step S61, by the decision part 10 receiving from the receive part 13 of the server 1 a text message sent from the mobile phone 5A of user A, the process is commenced. The text message includes the mobile phone number, contents of the text message, sender information, and the presence of the notification of the send result. Now assume that the mobile phone number of user C is "020-444-4444", contents of the text message is "Returns to the office at 3 p.m.", and the sender information is the mobile phone number of user A i.e. "020-444-4444."

Incidentally, when a text message is sent with each application from the PC client 3, the message receive part 7 of the server 1 receives the text message and notifies the decision part 10 of it. In this case, information for identifying the sender and receiver is a user's name or an IP address. If the text message is sent by e-mail, the information is an e-mail address; if the text message is sent by IRC, the information is a nickname.

In step S62, the decision part 10 searches in the status storage part 9 with the received mobile phone number "020-444-4444" as a search key and obtains the status of user C. Similarly, the decision part 10 also obtains the status of the sender.

In step S64, the decision part 10 determines whether or not the PC client of user B is connected to the Internet 2. In this example, since the IP address of user C is not empty, it is determined that the PC client is connected and step S 65 ensues. If it is not connected, the text message is sent to the send part 14 and step S 74, which is described below, ensues.

In step S65, it is determined whether or not the PC client 3 of user C is in operation. Namely, if a screensaver is active on the PC client of user C, it is assumed that user C is not in front of the PC and a mobile phone is selected as a destination. The received text message is stored in the message storage part 12. Conversely, a screensaver is not active on the user C's PC in this example. Therefore the other party is assumed to be in front of the PC, the PC client of user C is selected as a destination, and step S66 ensues.

In step S66, the decision part 10 determines whether or not an Internet application of the PC client is active on the PC client 3 of user C. Specifically, by referring to FIG. 2, it is understand that the e-mail address of user C is written and the e-mail is being used. In this case, step S67 ensues. Conversely, if the Internet application is not active, step S68, which is described later, ensues.

In step S67, the decision part 10 obtains a necessary parameter for sending the text message with an e-mail application such as an e-mail address from the status storage part 9. At this moment the decision part 10 also obtains the name of user A.

In step S68, the decision part 10 obtains a necessary parameter for directly sending the text message such as an IP address from the status storage part 9. At this moment the decision part 10 also obtains the name of user A.

In step S69, the decision part 10 notifies the text message send part 6 of the text message and the information obtained in step S67 or S68 and requests send. In this example, the text message is configured to an e-mail message by text message send part 6 and sent to the e-mail address of user C. In the PC client 3 of user C which received the e-mail message, the text message is displayed on an window shown in FIG. 7. The e-mail message sent from the server is usually sent to a client via an e-mail server.

In above-mentioned step S63, if it is determined that the PC client of user C is not active, step S70 ensues.

In step S70, the decision part 10 obtains a parameter which is necessary to send the text message to the mobile phone of user C such as a mobile phone number from the status storage part 9. At the same time, the decision part 10 also obtains the name of user A, which is a sender, the mobile phone number of user A, and the number of whereabouts. If it is determined there is no statuses and step S70 ensues, the parameter of user C is not obtained. Consequently, the other party's phone number that were sent when the previous message was received "020-444-4444" is set to the other party's phone number and next step S71 proceeds.

In step S71, the decision part 10 passes the information obtained in the above-mentioned step S70 to the send part 14 and requests radio transmission.

In step S72, the decision part 10 determines whether or not the mobile phone of user C can notify the server 1 that the text message was read and the sender requests notification. If both is possible, step S73 ensues. If the notification from the mobile phone is impossible, the process returns to step S61 and waits for the reception of the text message.

In step S73, the decision part 10 sends the sent text message, the sender's name, and send notification including a send terminal and a receive terminal to the notification management part 11. And step S61 returns. As described later, the notification part 11 writes contents of the received send notification in the message table.

In the above-mentioned step S64 or S65, if it is determined that the PC client of user C is not connected to the Internet or the PC is not currently used, step S47 ensues.

In step S74, the decision part 10 determines whether or not sender A requests notification of a send result. If sender A requests the notification, then the above-mentioned step S70 ensues and the notification to the mobile phone is sent.

In step S75, the decision part 10 creates result notification addressed to the sender indicating that the text message is temporally stored in the message storage part 12.

In step S76, the decision part 10 determines send mode according to the status of sender A sends the result notification created in step S74. Namely, the decision part 10 sends the text message to the mobile phone because the PC client of receiver C is not connected to the Internet and notifies user A that a text message indicating it. The message is sent to the decision part 10 and transmitted to sender A in an appropriate way.

(2) Status Administration Process

Figure 14:
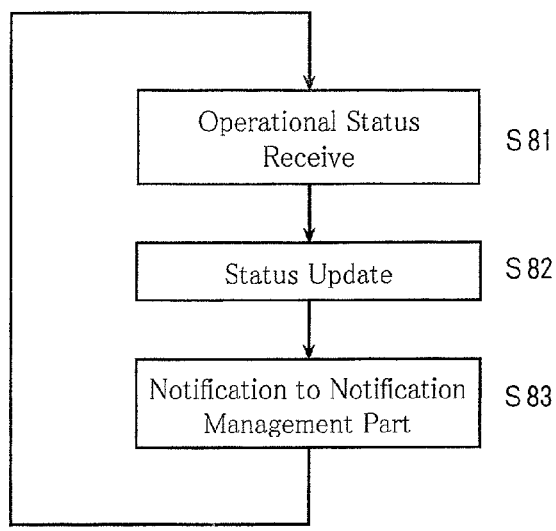
FIG. 14 is a flowchart showing flow of a status administration process.

Flow of status administration process managing the operational status of the PC client in the server 1 is described next with a flowchart shown in FIG. 14.

At first, it is notified the status administration part 8 of the server 1 from the status setting part 24 that the operational status in the PC client 3 of the user changed in step S81 and the process is commenced.

In step S82, the status administration part 8 updates the contents of the status storage part 9 for each user based on the received contents.

In step S83, the status administration part 8 further notifies the notification management part 11 of the change of the operational status.

(3) Reporting Administration Process

Reporting administration process performing notification to the sender from the server 1 is described below with a flowchart shown in FIG. 15. In this embodiment, the following four processes are performed: (i) main process, (ii) timeout process of stored text message, (iii) process of stored text message according to a receiver status, and (iv) process other than above.

(i) Main process

Figure 15:
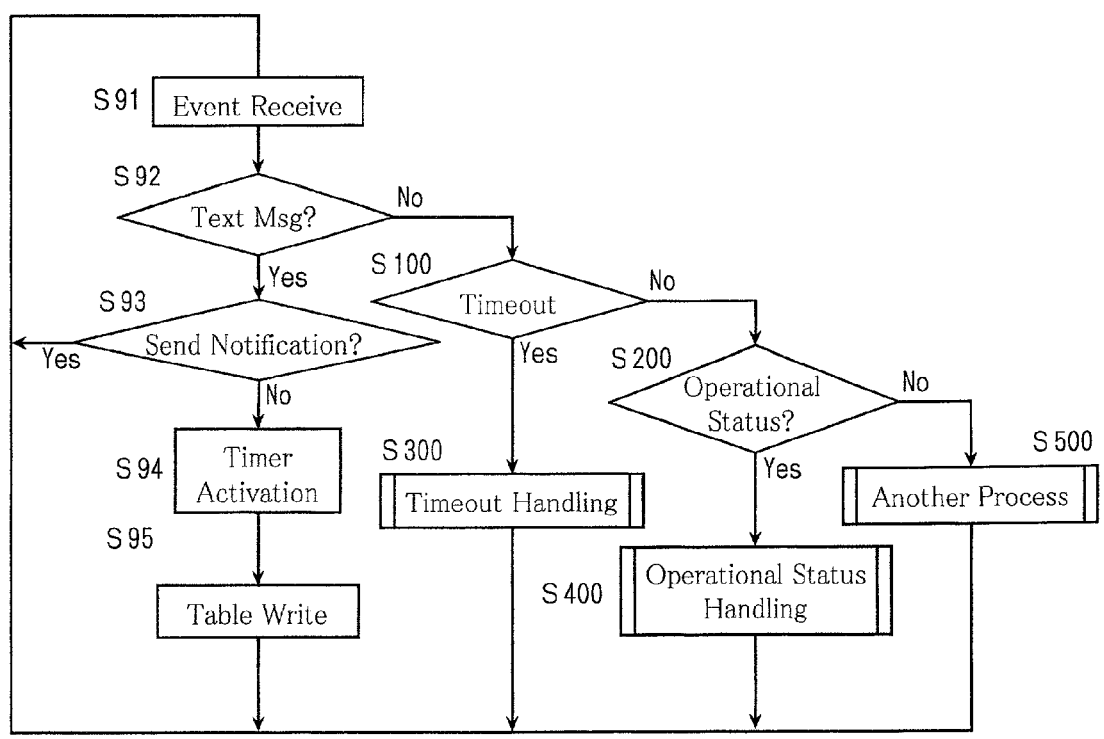
FIG. 15 is a flowchart showing flow of a reporting administration process.

At first, in step S91 in FIG. 15, receiving events such as message, timeout process, and status notification of user's activities commences the following process.

In step S92, the notification management part 11 determines whether or not the received event is a text message. If the event is a text message, step S93 ensues. Otherwise step S100, which will be described later, ensues.

In step S93, the notification management part 11 determines whether or not the received text message is send notification notified from the decision part 10 in step S37 in FIG. 13. If the received text message is the send notification, step S94 ensues. If the received text message is not the send notification, no process is performed and step S91 returns.

In step S94, the notification management part 11 activates a timer counting a prescribed time and manages the message table with timer ID.

In step S95, the notification management part 11 writes timer ID in addition to contents of the text message included in the send notification, sender and receiver, and send/receive type. Then step S95 ensues.

If it is determined in step S 92 that the text message is not send notification or is not an usual text message, then step S100 ensues.

In step S100, the notification management part 11 determines whether or not the received event is timeout notification. If the event is timeout notification, message timeout handling routine in step S300 ensues. In the timeout handling routine, stored text messages that timed out are deleted. Timeout process is described later. If the received event is not timeout notification, step S200 ensues.

In step S200, the notification management part 11 determines whether or not the received event is notification of the operational status of a PC client. If the event is the notification of the operational status, step S500 ensues and another handling routine is performed. The operational status handling routine in step S400 and another operational routine in step S500 are described later.

(ii) Timeout Process

Figure 16:
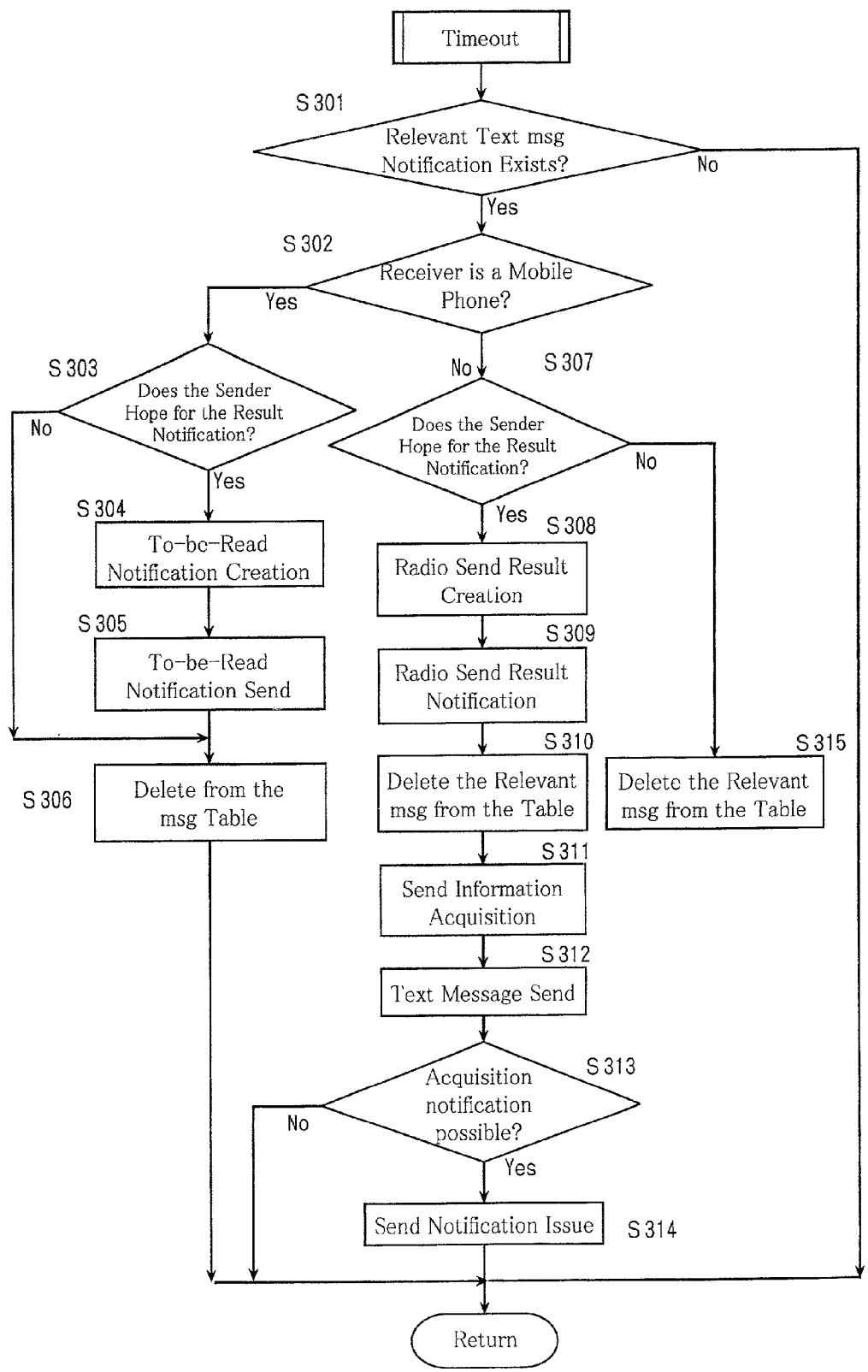
FIG. 16 is a flowchart showing flow of a time-out process.

If it is determined in step S100 that the event is timeout notification, the timeout handling routine in step S300 ensues. FIG. 16 is a flowchart showing flow of the timeout handling routine.

At first in step S301, the notification management part 11 determines whether or not the timed-out text message is left in the message table. If the text message is left, it is assumed that already-read notification from the receiver in a predetermined time and step S302 ensues. If the text message is not left, the main routine in above-mentioned FIG. 15 returns.

In step S302, the notification management part 11 determines whether or not the type of the receiver of the timed-out text message is a mobile phone. If the type is a mobile phone, step S303 ensues; if the type is a PC client, step S307 ensues.

In step S303, the notification management part 11 determines whether or not the sender hopes for notification of send result of the text message. If the sender hopes for the notification, step S304 ensues. If the sender does not hope for the notification, step S306 ensues.

In step S304, the notification management part 11 creates to-be-read result notification that indicates the sent text message was not read and step S305 ensues.

In step S305, the notification management part 11 notifies the decision part 10 of created to-be-read result notification. The decision part 10 selects appropriate send means and send method from the sender status and sends the to-be-read result notification to the sender.

In step S306, the notification management part 11 deletes an entry of relevant text messages from the message table and the main routine in above-mentioned FIG. 15 returns.

That is to say, in steps S303 to S305, result notification indicating "the text message is sent to the mobile phone, but it was not read." is sent to the sender.

In step S302, if the receiver is determined as a PC client, step S307 ensues.

In step S307, as is the case with the above-mentioned S303, the status administration part 11 determines whether or not the sender hopes for notification of send result. If the sender hopes for the notification, step S308 ensues. If the sender does not hope for the notification, step S315 ensues.

In step S308, the notification management part 11 creates radio send result notification indicating the text message is sent to the mobile phone.

In step S309, the notification management part 11 notifies the decision part 10 of the created radio send result notification. The decision part 10 that received the notification notifies the sender of the above-mentioned result notification in a send mode according to the operational status of the sender's PC client.

In step S310, the notification management part 11 passes the text message to the send part 14 and deletes the entry of the relevant text message from the message table.

In step S311, the notification management part 11 obtains necessary information such as the receiver's mobile phone number to send the text message to the mobile phone from the status storage part 9.

In step S312, the notification management part 11 notifies the send part 14 of send information and requests the transmission of text message.

In step S313, the notification management part 11 determines whether or not it can be notified that the receiver's mobile phone read the text message. If it can be notified, the step S314 ensues. Otherwise the main routine in above-mentioned FIG. 15 returns.

In step S314, the notification management part 11 issues send notification including sender/receiver, send/receive type, etc. This send notification is written in the message table in the above-described step S94.

(iii) Operational Status Process

Figure 17:
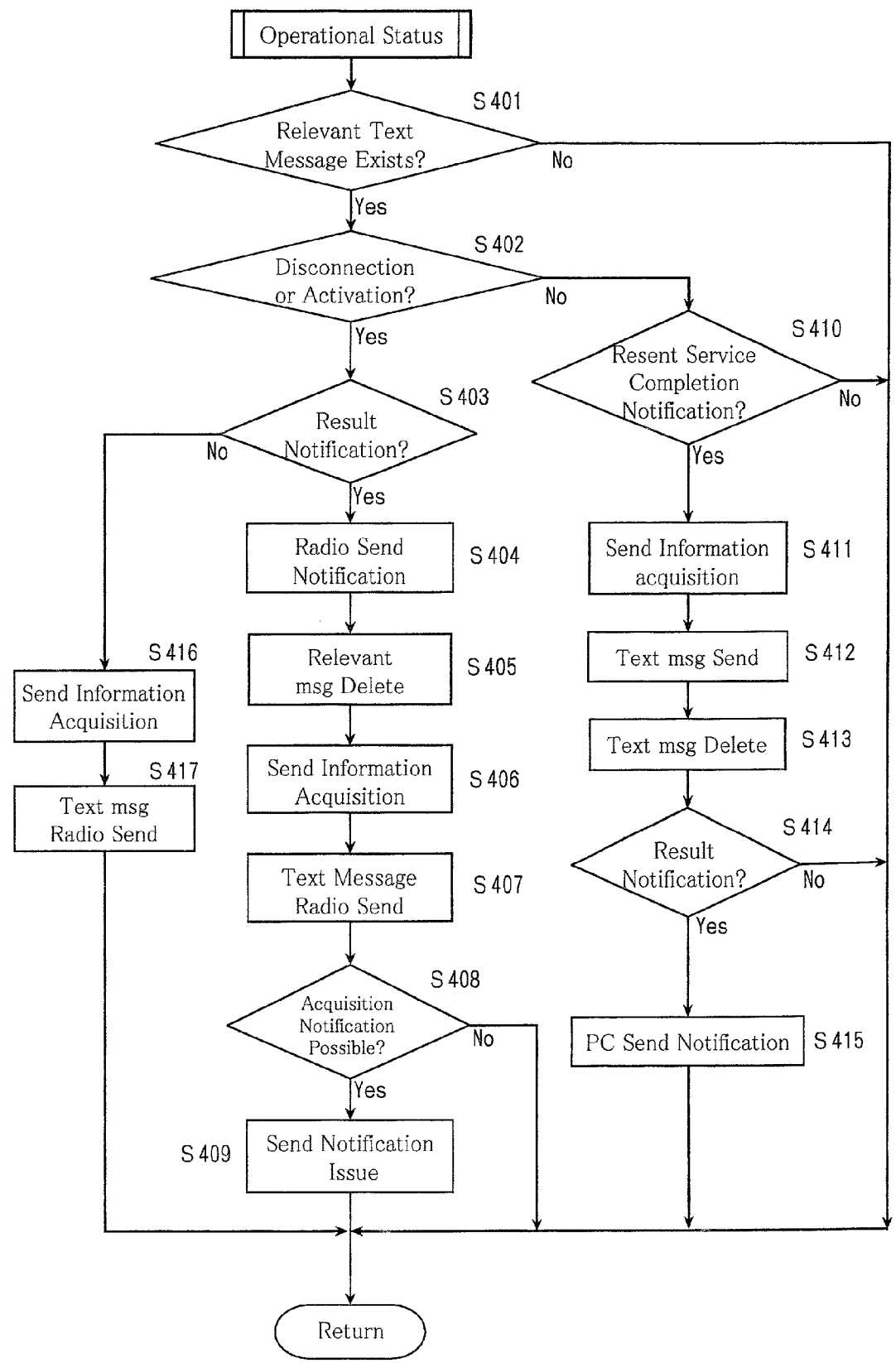
FIG. 17 is a flowchart showing flow of an operational status process.

In step S200, if the received event is determined as the change notification of the operational status of the PC client, step S400 operational status handling routine shown in FIG. 17 ensues. FIG. 17 is a flowchart showing flow of the operational status handling routine.

At first in step S401, the notification management part 11 determines whether or not the text message addressed to the PC client with the operational status changed is in the message table. If it is in the message table, step S402 ensues. If not, the main routine returns.

In step S402, the notification management part 11 determines whether or not the change of the status corresponds to "disconnection from the Internet" or "Screensaver active." If it corresponds to either of the above two statuses, step S403 ensues. If it is not corresponds to any of the above two statuses, step S410 ensues.

In step S403, the notification management part 11 determines whether or not the sender hopes for the send notification sent to the sender, and if the sender for it step S404 ensues. If the sender does not hope for it step S416 ensues.

In step S404, the notification management part 11 creates radio send result notification and notifies the decision part of it, assuming that the a text message that was previously sent to the PC client. For example, Radio send result notification with a message "The message addressed to 020-222-222 was not read in the PC and was sent to the mobile phone." is created. The decision part determines a send mode according to the status of the sender and requests it to be sent from the text message send part 6 or the send part 14.

In step S405, the notification management part 11 passes the text message to the send part 14 and deletes the entry of the relevant text message from the message table.

In step S406, the notification management part 11 obtains necessary information such as a mobile phone number to send it to the mobile phone from the status storage part 9.

In step S407, the notification management part 11 sends the obtained send information to the send part 14 and requests sending.

In step S408, the notification management part 11 determines whether or not that the receiver's mobile phone read can be notified. If it is possible, step S409 ensues. Otherwise the main routine in FIG. 10 returns.

In step S409, the notification management part 11 creates send notification including the sent text message, sender/receiver, and send/receive type, etc. This send notification is written in the message table in step S94 of the above-mentioned main routine.

If it is determined that the status change notified in above-mentioned S402 is not disconnection or activation, step S410 ensues.

In step S410, the notification management part 11 determines whether or not the notified status change is completion notification of an Internet application that is already sent. If it is completion notification, step S411 ensues; otherwise the main routine in FIG. 15 ensues.

In step S411, the notification management part 11 obtains send information necessary to send to PC client such as an IP address by referring to the status storage part 9.

In step S412, the notification management part 11 passes the send part 14 an obtained send message or text message and requests sending.

In step S413, the notification management part 11 deletes the relevant text message from the message table.

In step S414, the notification management part 11 determines whether or not the sender hopes for the notification of the send result. If the user hopes for the notification, step S415 ensues. If not, the main routine indicated in FIG. 15 ensues.

In step S415, the notification management part 11 creates a PC send result notification and notifies the decision part 10 of it, assuming that a text message previously sent to an Internet application of the PC client was not read. For example, a PC send result notification with a content "a text message addressed to channel #CA was not read and was sent to PC" is created. The decision part 10 selects a send means and send method according to the seder's status and requests sending from the text message send part 6.

In step S416, the notification management part 11 obtains information necessary to send to the mobile phone such as the mobile phone number from the status storage part 9.

In step S417, the notification management part 11 passes the obtained information to the send part 14 and requests sending.

(iv) Other Process

Figure 18:
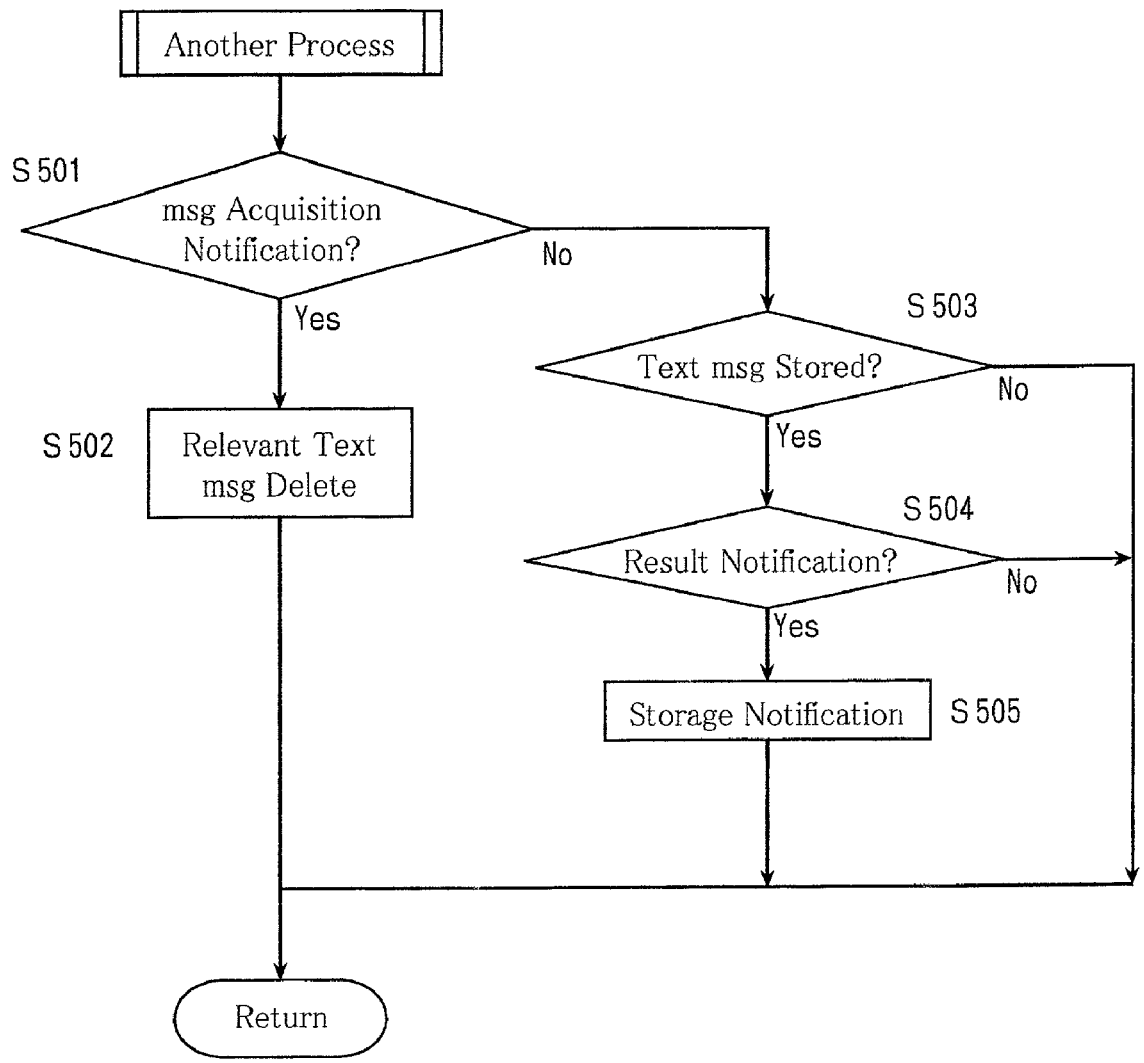
FIG. 18 is a flowchart showing flow of another process.

In step S200, if it is determined that the received event is not a change notification of the operational status, another handling routine in step S500 ensues. FIG. 18 is a flowchart showing flow of another handling routine.

At first in step S501, the notification management part 11 determines whether or not the received event is text message acquisition notification from the receiver. For example, if acquisition notification from a PC client or mobile terminal that received a text message is received by the text message receive part 7 or the receive part 13, the acquisition notification is sent to the notification management part 11. There may also be the case in which reply to an e-mail message or a confirmation command sent in the same channel of IRC may be detected by the text message receive part 7 and the acquisition notification 11 is sent to the notification management part 11. If the received event is acquisition notification, step S502 ensues; otherwise a below-described step S503 ensues.

In step S502, the notification management part 11 deletes the entry of the relevant text message from the message table and the main routine in FIG. 15 returns.

In step S503, the notification management part 11 determines whether or not the received event is notification indicating a text message to the mobile phone is stored. If it is the notification, step S504 ensues. Otherwise the main routine in FIG. 15 returns. That is to say, if a text message is stored in the message storage part 12, storage notification is sent to the notification management part 11 from the send part 14.

In step S504, the notification management part 11 determines whether or not the sender hopes for the notification of a send result. If the sender hopes for the notification, step S505 ensues. If not, the main routine in FIG. 15 ensues.

In step S505, the notification management part 11 creates storage result notification indicating a text message is stored. The decision part 10 determines a send mode according to a sender's status and requests sending of storage result notification from the send part 6 or the send part 14.

In the above process, time to be timed out or notification setting when a text message is not read immediately may be set for the server from a mobile phone or a PC client via the Internet. The setting can also be performed with a text message in a prescribed format.

Second Embodiment

A mobile terminal can obtain arbitrary information by sending a text message in a prescribed format from the mobile terminal with the text messaging system shown in the above-mentioned first embodiment.

Figure 19:
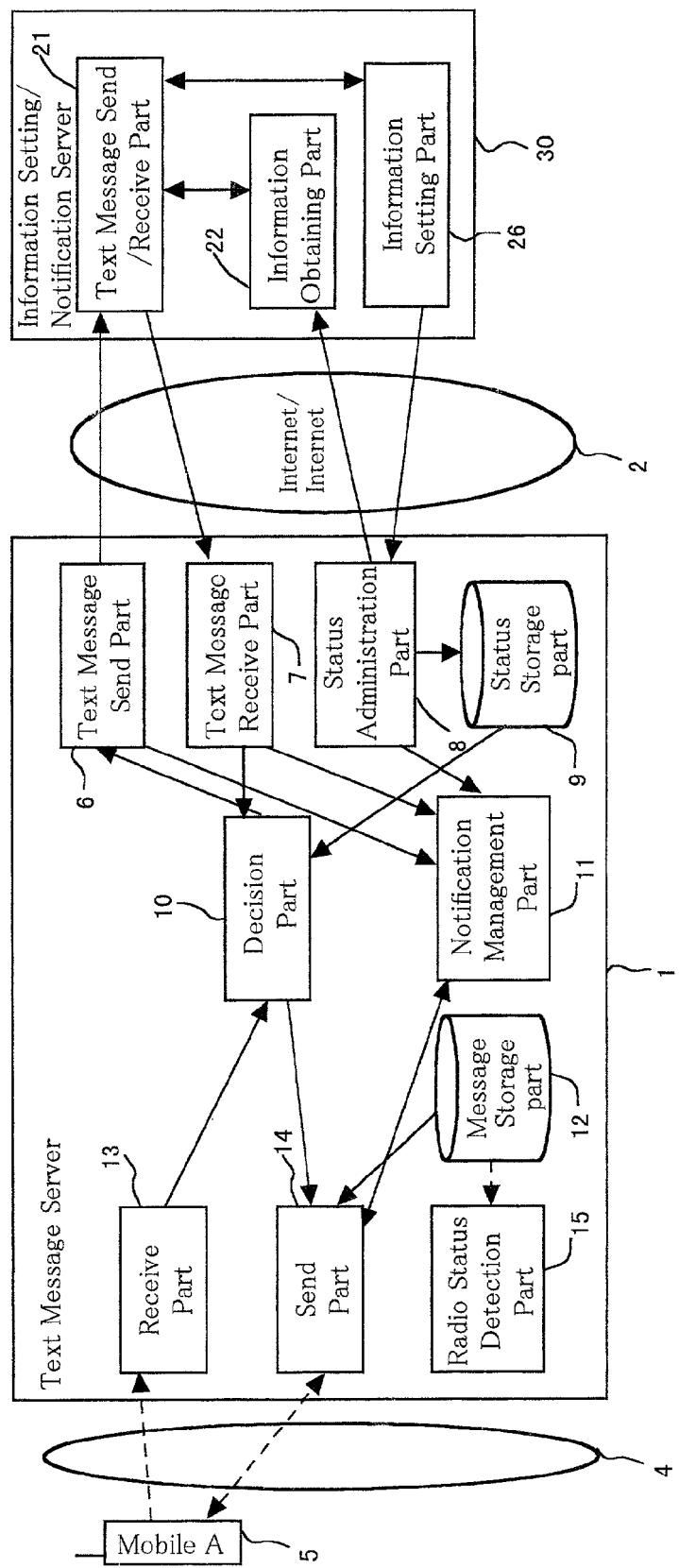
FIG. 19 is a configuration of a text messaging system according to a second embodiment.

For example, FIG. 19 shows a configuration diagram of a text messaging system that changes or refers to the operational status of a PC client managed by the server 1. In FIG. 19, information server 30 is used as a PC client. The mobile terminal 5 sends a text message in a format for sending the text message to the PC client. The information server 30 pretends to be the PC client and sets an operational status form the server 1.

For example, a destination or schedule information is sent from a mobile terminal 5 to a phone number of the information server 30 as a text message in a prescribed format. As described, the server 1 sends the text message to the information server 30. The information setting part 26 of the information server 30 that received the text message analyzes the received text message, and notifies the status administration part 8 of information that changes the operational status of the sender.

The information setting part 26 sends a text message indicating that the destination of another user needs to be known with a phone number of the other user. Then the server 1 sends the text message to the information server 30.

The information acquisition part 25 of the information server 30 analyzes the received text message and obtains the operational status of the other PC client with the phone number as a search key. The obtained information is sent as a text message from the information server to the number of the sender mobile terminal. Accordingly, for example, current whereabouts of another user can be identified and a call can be made to him/her.

Third Embodiment

Figure 20:
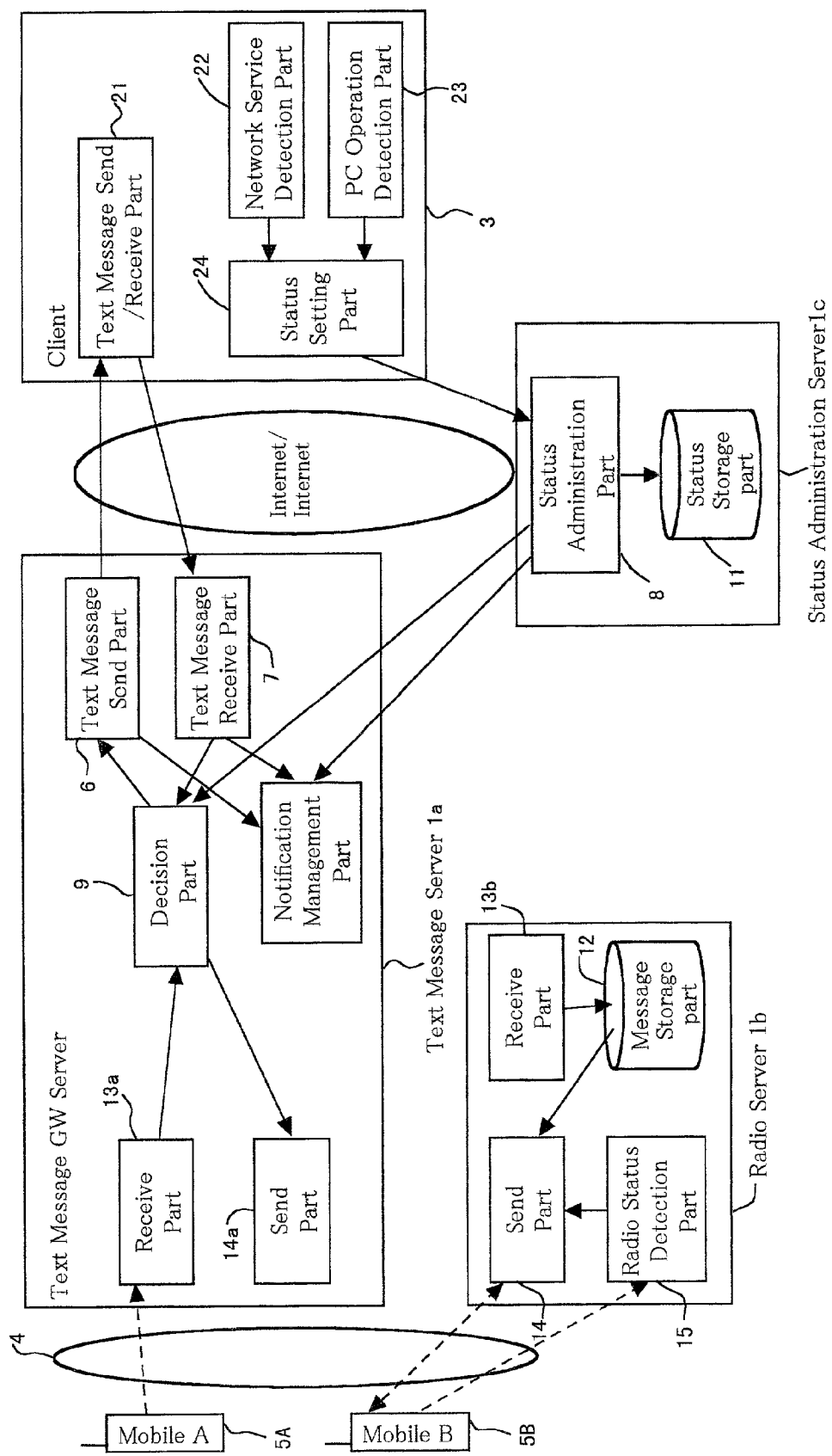
FIG. 20 is a configuration of a text messaging system according to a third embodiment.
Figure 21:
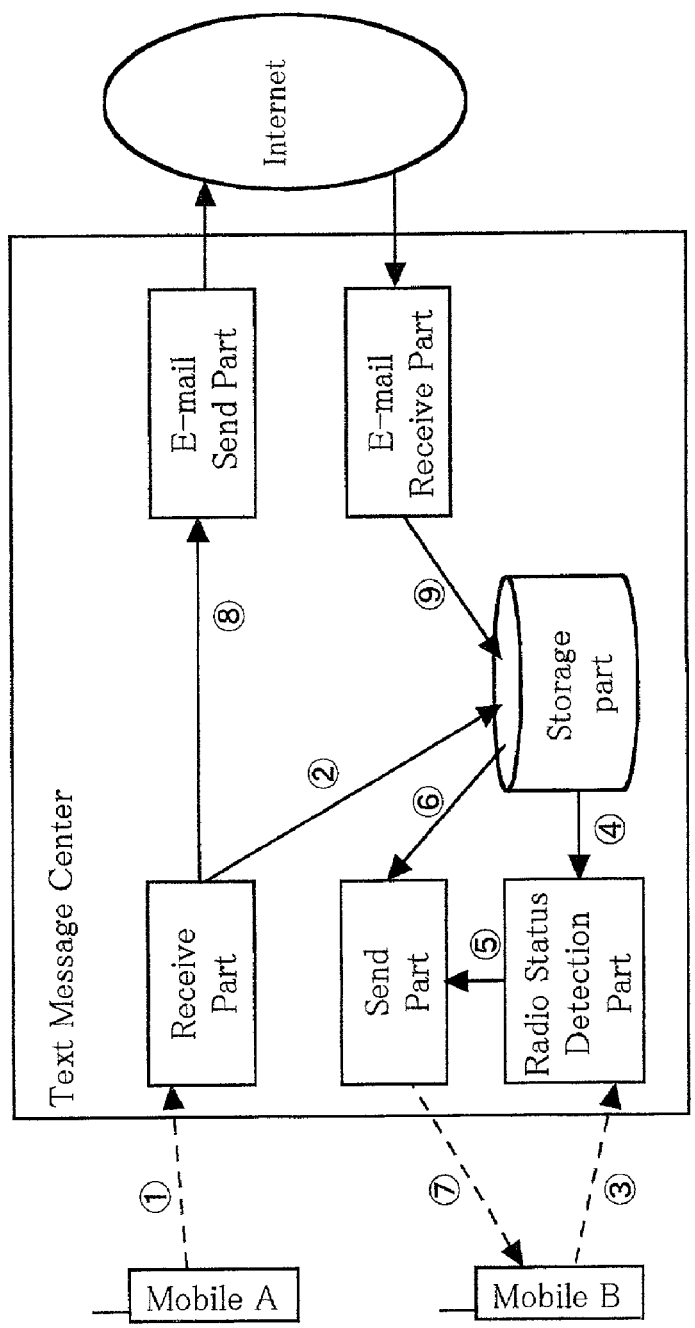
FIG. 21 is a conceptual configuration diagram of a conventional text messaging system using mobile terminals.

As shown in FIG. 20, the radio server 1b may be made to have the message storage part 12 and radio status detection part 15 by installing a radio sever 1b independent of a text message server 1a. In this case, the receive part 13a and 13b and the send part 14a and 14b are respectively installed in the text message server 1a and the radio server 1b. The status administration server 1c may also be made to have the status administration part 8 and decesion part 9 by further installing an independent status administration server 1.

Fourth Embodiment

A where-to-call number may be sent with a text message so that the other party can immediately call back when the text message is sent from a PC client or a mobile phone. A receiver can call the number and talk to the other party as soon as he receives the text message. For example, the decision part 10 refers to the sender's status as well as the receiver's status. If the number of current whereabouts is set in the status storage part 12, the decision part 10 sends the phone number as a callback number with the text message. If the number of current whereabouts is not set, the mobile phone number may be sent with the text message as a callback number.

Fifth Embodiment

In addition to the above-mentioned embodiment, it is conceivable that a schedule in a particular condition is obtained or a function such as acquisition of e-mail is added to the server 1. Services can easily be added without changing server configuration.

Sixth Embodiment

In the above-mentioned embodiment, a single mobile communication network and a single Internet are respectively shown. However, they may be multiple. Since the status administration part of the server 1 holds only one active status per user, if the number of networks increases, it can be supported.

INDUSTRIAL APPLICABILITY

Use of this invention allows a text message to be sent in a send mode according to the other party's status and to be sent and received substantially in real time. By notifying the sender of send result such as the text message not being checked by the other party, the text message can be notified in another send mode. Furthermore, the sender can know which send mode is used in which the text message was sent and thus communications with texts can be smoothly performed in real time.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A text messaging system including a plurality of information terminals provided with communications parts, and servers connected to the information terminals via communication lines responsive to the communication parts, the text messaging system comprising:

a plurality of transmitters having different transmission modes and one of the transmitters provided in each of the information terminals for transmitting to the servers text messages addressed to other of the information terminals;

a receiver provided in the information terminals for receiving from the servers a text message from other of the information terminals;

a status detector provided in the information terminals for detecting and reporting to the servers an operational status of each of the transmitters including at least a change of status of the connection with the communication lines;

a receiver provided in the servers for receiving text messages from any one of the information terminals;

a status administrator provided in the servers for storing, per user of any one of the information terminals, the operational status, including the change of status, of each of the transmitters means of each information terminal reported from said status detector;

a selector provided in the servers for referring to the operational status, including the change of status, stored by the status administrator of an information terminal that is selecting a message destination and a transmitter and transmission mode for the received text messages according to the stored operational status and change of status; and a transmitter provided in the servers for transmitting text messages received from the information terminals to the destination information terminal according to the dynamically selected transmission mode using the dynamically selected transmitter.

2. The text messaging system according to claim 1, wherein the change of status that is detected and reported is a change from a connected status with the Internet to a disconnected status or change in a use of an information terminal by a user.

3. A text messaging system including a mobile terminal and an information terminal respectively provided with communication parts, and a server connected to the mobile terminal and to the information terminal via a communications line responsive to the communication parts, the text messaging system comprising:

a plurality of transmitters having different transmission modes in the information terminal for transmitting to the server text messages addressed to the mobile terminal, or to another information terminal;

receiver provided in the information terminal for receiving from the server text messages from the mobile terminal, or from another information terminal;

a status detector means in the information terminal for detecting and reporting to the server an operational status of the each transmitters including at least a change of status of the connection with the communications line;

a receiver provided in the server for receiving text messages from the mobile terminal or the information terminal;

a status administrator means provided in the server for storing per user of the information terminal, an operational status of each transmitter of the information terminal reported from said status detector; and a selector provided in the server for referring to the operational status, including the change of status, stored by the status administrator of an information terminal that is a destination of the text message received from the information terminal, and for dynamically selecting a message destination and a transmission mode and a transmitter for the received text messages according to the stored operational status and change of status; and a transmitter provided in the server for transmitting to the information terminal text messages received from the mobile terminal, and transmitting to the mobile terminal text messages received from the information terminal, or transmitting text messages received from the mobile terminal or the information terminal to another mobile terminal or to another information terminal according to the dynamically selected transmission mode using the dynamically selected transmitter.

4. A text messaging system according to claim 3, wherein:

said status detector means further detects and reports to the server whether the information terminal is being used; and said selector, upon the information terminal being used determines the information terminal to be a transmission destination for text messages.

5. A text messaging system according to claim 3, the information terminal further being provided with a service detector for detecting and for reporting to the server network-application operational status in the information terminal, wherein:

said status administrator stores the reported network-application operational status; and said selector means, wherein the network application is operable on the server, determines to transmit received text messages using the network application if the network application is running on the information terminal.

6. A text messaging system according to claim 3, wherein said transmitters is enabled to notify the server that a text message has been read, further comprising:

a reporting administrator provided in the server for saving text messages transmitted to the information terminal, and, wherein if not notified to the effect that a text message has been read, for forwarding the text message to the mobile terminal.

7. A text messaging system according to claim 6, wherein said reporting administrator means forwards to the mobile terminal text messages transmitted to the information terminal in response to change in operational status of the information terminal.

8. A text messaging system according to claim 6, wherein if a text message transmitted to the information terminal is not read within a predetermined time period, said reporting administrator means forwards the text message to the mobile terminal.

9. A text messaging system according to claim 6, wherein said reporting administrator means in predetermined instances reports to text message send sources that their text messages have been sent to the mobile terminal.

10. A text messaging system according to claim 6, wherein if said reporting administrator cannot send a text message to the mobile terminal, said reporting administrator stores the text message and reports to the text message send source that its text message has been stored.

11. A text messaging system according to claim 3, wherein:

said status detector reports to the server text message senders' contact phone numbers;

said status administrator stores the reported phone numbers; and wherein a text message is sent from the information terminal to the mobile terminal, if the senders' contact phone number has been set, said detector adds the phone number to and transmits the text message.

12. A text messaging system according to claim 3, further comprising a proxy information terminal connected to the communications line, wherein said proxy information terminal is provided with:

a receiver for receiving from the server text messages from the mobile terminal;

an information acquirer for obtaining in accordance with the received text messages operational status of other information terminal wherein the system includes a plurality thereof;

a transmitter for transmitting the obtained operational status as a text message to the mobile terminal; and an information setter for setting and reporting to the server an operational status of the other information terminal in accordance with the received text messages.

13. A text messaging system including a mobile terminal and an information terminal respectively provided with communication parts, a first server connected to the information terminal via communications line responsive to the communication parts, and a second server connected to the mobile terminal and to the information terminal via the communications line, the text messaging system comprising:

a plurality of transmitters having different transmission modes provided in the information terminal for transmitting to the second server text messages addressed to the mobile terminal, or to another information terminal wherein the system includes a plurality thereof;

a receiver provided in the information terminal for receiving from the second server text messages from the mobile terminal, or from other information terminal wherein the system includes a plurality thereof;

a status detector provided in the information terminal for detecting and reporting to the first server an operational status of the each transmitter including at least a change of status of connection with the communications line;

a status administrator provided in the first server for gathering and storing per user of the information terminals, an operational status, including the change of status, of the each transmitter from each information terminal;

a receiver provided in the second server for receiving text messages from the mobile terminal or the information terminal;

a selector provided in the second server for obtaining from the first server operational status, including the change of status, of the information terminal that is a destination of the text message received from the information terminal, and for dynamically selecting a transmission mode for received text messages according to the obtained operational status and change of status; and a transmitter provided in the second server for transmitting text messages received from the mobile terminal or the information terminal to another mobile terminal or a destination information terminal according to the dynamically selected transmission mode using the dynamically selected transmitter.

14. A text messaging system according to claim 13, wherein the information terminal is enabled to notify the second server that a text message has been read, and further comprising:

a reporting administrator provided in the second server for saving text messages transmitted to the information terminal, and, wherein not notified to the effect that a text message has been read, for forwarding the text message to the information terminal.

* * * * *

UNITED STATES PATENT AND TRADEMARK OFFICE
CERTIFICATE OF CORRECTION

| | | |
|---|---|---|
| PATENT NO. | : 7,437,413 B2 | |
| APPLICATION NO. | : 09/772000 | |
| DATED | : October 14, 2008 | |
| INVENTOR(S) | : Satoshi Okuyama et al. | |

It is certified that error appears in the above-identified patent and that said Letters Patent is hereby corrected as shown below:

Column 1, Line 2, below "TEXT MESSAGING SYSTEM AND METHOD" insert --CROSS-REFERENCE TO RELATED APPLICATIONS--.

Column 20, Line 62, change "communications" to --communication--.

Column 21, Line 17, after "transmitters" delete "means".

Column 21, Line 49, after "detector" delete "means".

Column 21, Line 56, after "administrator" delete "means".

Column 22, Line 11, after "detector" delete "means".

Column 22, Line 24, after "selector" delete "means".

Column 22, Line 37, after "administrator" delete "means".

Column 22, Line 44, after "administrator" delete "means".

Column 22, Line 47, after "administrator" delete "means".

Signed and Sealed this

Sixth Day of January, 2009

JON W. DUDAS
*Director of the United States Patent and Trademark Office*